United States Patent
Gouda et al.

(10) Patent No.: US 10,180,326 B2
(45) Date of Patent: Jan. 15, 2019

(54) STAYING STATE ANALYSIS DEVICE, STAYING STATE ANALYSIS SYSTEM AND STAYING STATE ANALYSIS METHOD

(71) Applicant: PANASONIC INTELLECTUAL PROPERTY MANAGEMENT CO., LTD., Osaka (JP)

(72) Inventors: Youichi Gouda, Ishikawa (JP); Yuichi Matsumoto, Kanagawa (JP); Hiroaki Yoshio, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 592 days.

(21) Appl. No.: 14/520,769

(22) Filed: Oct. 22, 2014

(65) Prior Publication Data

US 2015/0120237 A1 Apr. 30, 2015

(30) Foreign Application Priority Data

Oct. 29, 2013 (JP) .................................. 2013-224135

(51) Int. Cl.
*G01C 21/00* (2006.01)
*G06Q 30/02* (2012.01)
(Continued)

(52) U.S. Cl.
CPC ......... *G01C 21/00* (2013.01); *G06K 9/00778* (2013.01); *G06Q 30/0201* (2013.01);
(Continued)

(58) Field of Classification Search
CPC .... G08G 1/0104; G08G 1/0133; G06Q 50/22; G06T 7/20; G06T 7/215; G06T 2207/10016; G06K 9/00778
(Continued)

(56) References Cited

U.S. PATENT DOCUMENTS 8,310,542 B2 11/2012 Girgensohn et al.
8,907,985 B2 12/2014 Fujii et al.
(Continued)

FOREIGN PATENT DOCUMENTS

JP 2009-134688 6/2009

OTHER PUBLICATIONS

U.S. Appl. No. 14/388,857 to Jun Nishimura et al., filed Sep. 29, 2014.
(Continued)

*Primary Examiner* — Roy Y Yi
*Assistant Examiner* — Jeffrey Aiello
(74) *Attorney, Agent, or Firm* — Greenblum & Bernstein, P.L.C.

(57) ABSTRACT

A staying state analysis device measuring a stay frequency of moving objects in a target area and generating a heat map visualizing a state of distribution of the stay frequency includes: a position information sorter sorting pieces of position information of the moving objects according to a degree of possibility that the pieces of position information may include an error due to a missing part that may be in traffic lines of the moving objects; a missing part position detector detecting a position of the missing part in the traffic lines based on at least two groups of pieces of position information sorted by the sorter; a corrected distribution information generator generating corrected distribution information representing the stay frequency of the moving objects corrected based on a result of detection by the missing part position detector; and a heat map generator generating the heat map based on corrected distribution information.

8 Claims, 17 Drawing Sheets

(51) Int. Cl.
 G06K 9/00 (2006.01)
 G06T 7/215 (2017.01)
(52) U.S. Cl.
 CPC .... G06T 7/215 (2017.01); *G06T 2207/10016* (2013.01); *G06T 2207/30196* (2013.01); *G06T 2207/30241* (2013.01)
(58) Field of Classification Search
 USPC .......... 382/103, 107; 701/117, 532; 702/150
 See application file for complete search history.

(56) References Cited

U.S. PATENT DOCUMENTS

| | | | |
|---|---|---|---|
| 8,929,613 | B2 | 1/2015 | Yoshio |
| 2004/0181424 | A1* | 9/2004 | Hale ................ G06Q 10/02 705/6 |
| 2006/0068787 | A1* | 3/2006 | Deshpande ............ H04L 67/04 455/435.3 |
| 2008/0046165 | A1* | 2/2008 | Downs ................ G08G 1/0104 701/117 |
| 2008/0262925 | A1* | 10/2008 | Kim .................... G06Q 30/02 705/14.27 |
| 2009/0134968 | A1 | 5/2009 | Girgensohn et al. |
| 2009/0157482 | A1* | 6/2009 | Jung ................. A61B 5/04842 705/7.33 |
| 2009/0228325 | A1* | 9/2009 | Simmons ......... G06Q 10/06313 705/7.23 |
| 2011/0231419 | A1* | 9/2011 | Papke ............... G06F 17/30793 707/756 |
| 2013/0039590 | A1 | 2/2013 | Yoshio |
| 2013/0230245 | A1 | 9/2013 | Matsumoto et al. |
| 2013/0278631 | A1* | 10/2013 | Border ............... G02B 27/017 345/633 |
| 2014/0037147 | A1 | 2/2014 | Yoshio et al. |
| 2014/0104034 | A1* | 4/2014 | Ambrefe, Jr. ...... G07C 9/00087 340/4.4 |
| 2014/0195138 | A1* | 7/2014 | Stelzig ................ G08G 1/0116 701/119 |
| 2014/0222501 | A1 | 8/2014 | Hirakawa et al. |
| 2014/0334718 | A1 | 11/2014 | Yamada et al. |

OTHER PUBLICATIONS

U.S. Appl. No. 14/496,055 to Yuichi Matsumoto et al., filed Sep. 25, 2014.
U.S. Appl. No. 14/496,051 to Yuichi Matsumoto et al., filed Sep. 25, 2014.
Search report from E.P.O., dated Mar. 2, 2015.
Lee Donghoon et al., "Understanding human-place interaction from tracking and identification of many users", 2013 IEEE 1st International Conference on Cyber-Physical Systems, Networks, and Applications (CPSNA), IEEE, Aug. 19, 2013, XP032491949, pp. 112-115.
Weizhi Nie et al., "Multiple Person Tracking by Spatiotemporal Tracklet Association", Advanced Video and Signal-Based Surveillance (AVSS), 2012 IEEE Ninth International Conference on, IEEE, Sep. 18, 2012, XP032248270, pp. 481-486.

* cited by examiner

Fig.12
 region in which notable event (congestion or queuing) has occurred
—— detected movement line
 grid cell in which missing part is created in movement line
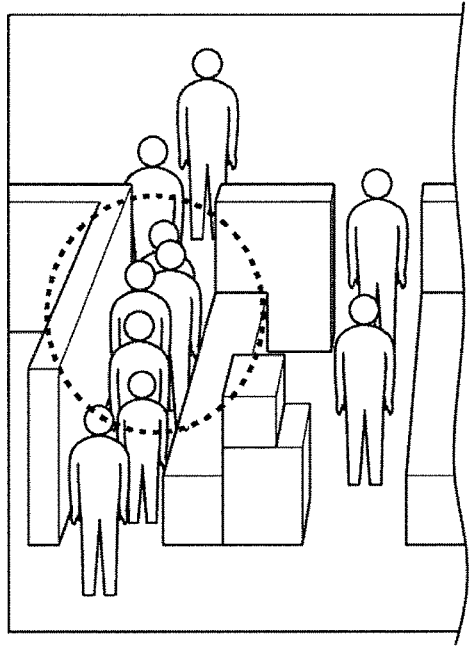
(A)
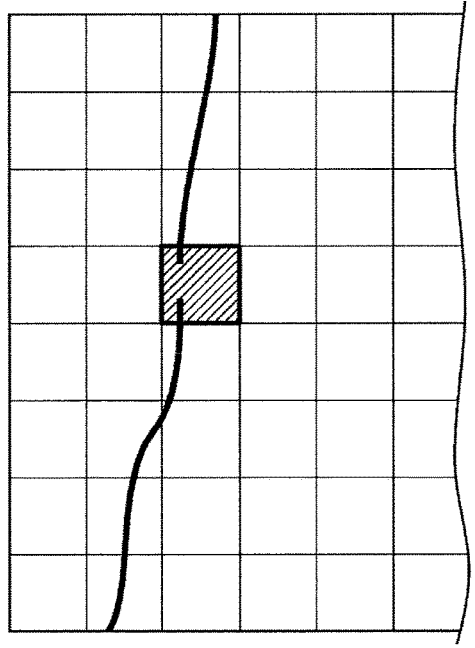
(B−1)
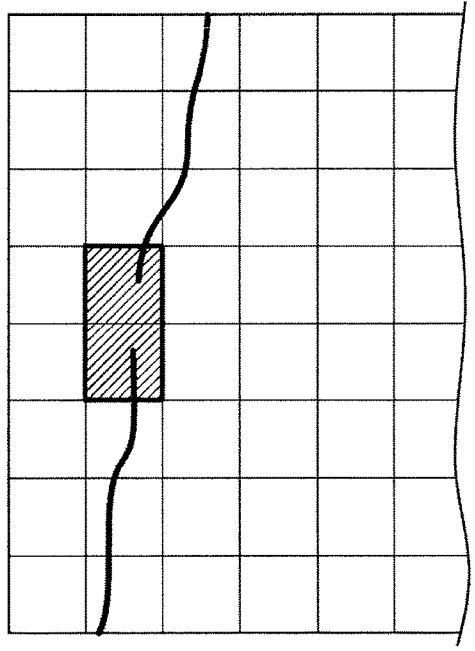
(B−2)
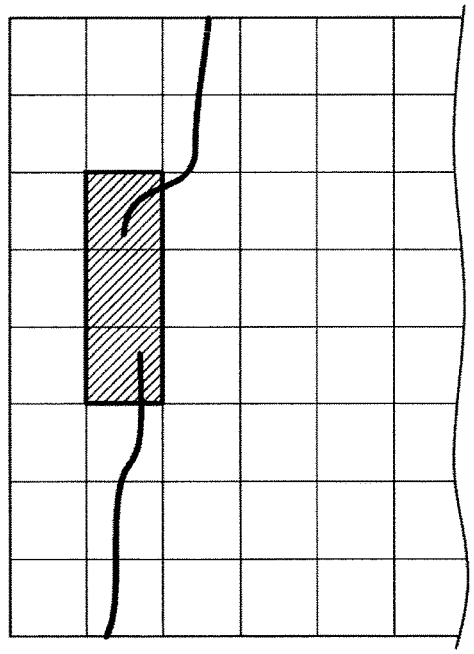
(B−3)

STAYING STATE ANALYSIS DEVICE, STAYING STATE ANALYSIS SYSTEM AND STAYING STATE ANALYSIS METHOD

TECHNICAL FIELD

The present invention relates to a staying state analysis device, a staying state analysis system and a staying state analysis method for measuring a stay frequency of moving objects in a target area and generating a heat map visualizing a state of distribution of the stay frequency for display on a display device.

BACKGROUND OF THE INVENTION

In a commercial establishment such as a retail store, a queue (line) of customers waiting for checkout may be formed at the checkout counter when the number of customers who want to pay for their purchases increases to a certain point, and this necessitates the customers to wait in the queue for their turn. If a staying state of customers around the checkout counter; namely, how long the customers are staying around the checkout counter, can be grasped, it is possible to develop measures for improving the operation of the store based on the grasped staying state of the customers, to thereby improve the customer satisfaction and streamline the operation of the commercial establishment.

With regard to grasping of the staying state of persons, a technology is conventionally known which generates a heat map that visualizes a state of distribution of an amount of activity of persons in a target area (see JP2009-134688A). By use of such a heat map, a user can grasp at a glance a state of distribution of a stay frequency of persons (number of staying persons detected per unit time), namely, how many persons are staying in which region of the target area, and this can improve the convenience of the user.

To generate a heat map visually showing a state of distribution of the stay frequency of persons in the target area, it is necessary to obtain the stay frequency in each segment of the target area and generate distribution information representing the state of distribution of the stay frequency, and to obtain the stay frequency in each segment of the target area, it is considered to count the traffic lines of persons in each segment, where a traffic line of a person is formed by arranging the detection positions of the person in chronological order.

On the other hand, in a state where a queue of multiple persons is formed as described above, some of the persons may overlap each other along the line of sight of the camera so that a "background" person may be blocked from view. This phenomenon is known as occlusion. If occlusions occur, the accuracy of person detection decreases and the traffic lines of persons may include a missing part. If a traffic line includes a missing part, the traffic line, which should be treated as a single line, is divided at the missing part into two traffic lines, and this may cause multiple counting or missed counting of the traffic line, thereby making it impossible to obtain accurate stay frequency and resulting in a heat map with a reduced accuracy.

However, the aforementioned conventional technology does not proposed any measure for addressing such a problem, and thus, a technology is desired which, even in a situation where traffic lines may include a missing part, can generate a highly accurate heat map by making appropriate corrections to avoid multiple counting and missed counting of the traffic lines.

The present invention is made to solve the aforementioned problems in the prior art, and a primary object of the present invention is to provide a staying state analysis device, a staying state analysis system and a staying state analysis method which, even in a situation where traffic lines may include a missing part, can generate a highly accurate heat map by making appropriate corrections.

SUMMARY OF THE INVENTION

To achieve the foregoing object, a first aspect of the present invention provides staying state analysis device for measuring a stay frequency of moving objects in a target area and generating a heat map visualizing a state of distribution of the stay frequency for display on a display device, the staying state analysis device including: a position information sorting unit that sorts pieces of position information of the moving objects obtained from a moving object detection device in accordance with a degree of possibility that the pieces of position information may include an error due to a missing part that may be created in traffic lines of the moving objects; a missing part position detection unit that detects a position of the missing part in the traffic lines based on at least two groups of pieces of position information sorted by the position information sorting unit; a corrected distribution information generation unit that generates corrected distribution information representing the stay frequency of the moving objects corrected based on a result of detection by the missing part position detection unit; and a heat map generation unit that generates the heat map based on the corrected distribution information generated by the corrected distribution information generation unit.

According to this structure, by use of the two groups of pieces of position information sorted in accordance with the degree of possibility that the pieces of position information may include an error due to a missing part that may be included in the traffic lines of the moving objects, it is possible to detect the position of the missing part in the traffic lines easily and with a high accuracy. Further, by generating corrected distribution information based on the result of the detection, it is possible, even in a situation where the traffic lines may include a missing part, to make an appropriate correction to eliminate multiple counting and missed counting due to the missing part in the traffic lines, to thereby generate a highly accurate heat map.

In a second aspect of the present invention, the position information sorting unit includes a notable event detection unit that detects, based on the pieces of position information of the moving objects, a notable event that may cause a missing part to be created in the traffic lines of the moving objects, and sorts the pieces of position information based on whether the notable event is detected by the notable event detection unit.

The position information obtained when the notable event is not detected has a low possibility of including an error while the position information obtained when the notable event is detected has a high possibility of including an error, and thus, by performing the sorting of the pieces of position information according to the result of detection of the notable event, the sorting of the pieces of position information in accordance with the degree of possibility that the pieces of position information may include an error can be achieved easily and with a high accuracy.

In a third aspect of the present invention, the notable event detection unit detects, as the notable event, a congestion event in which a plurality of moving objects are present densely.

In a situation where multiple moving objects are present densely, occlusions between the moving objects tend to occur so that the accuracy of the moving object detection tends to be lowered, and therefore, the traffic lines of the moving objects often include a missing part therein. In the above structure, by sorting the items of position information based on whether the congestion event is detected, it is possible to detect the position of the missing part in the traffic lines with a high accuracy.

In a forth aspect of the present invention, the notable event detection unit detects, as the notable event, a queuing event in which a plurality of moving objects stand in a queue.

In a situation where multiple moving objects are present in a queue, occlusions between the moving objects tend to occur so that the accuracy of the moving object detection tends to be lowered, and therefore, the traffic lines of the moving objects often include a missing part therein. In the above structure, by sorting the items of position information based on whether the queuing event is detected, it is possible to detect the position of the missing part in the traffic lines with a high accuracy.

In a fifth aspect of the present invention, the staying state analysis device further includes a distribution information comparison unit that generates two sets of distribution information for comparison, each representing a state of distribution of the stay frequency of the moving objects, respectively from the two groups of pieces of position information sorted by the position information sorting unit, and compares the two sets of distribution information for comparison with each other, wherein the distribution information comparison unit generates differential distribution information which is a difference between the two sets of distribution information for comparison, and wherein the missing part position detection unit detects the position of the missing part in the traffic lines based on the differential distribution information.

According to this structure, by comparing the two sets of distribution information with each other, it is possible to detect the position of the missing part in the traffic lines efficiently.

In a sixth aspect of the present invention, the heat map generation unit generates a segmented heat map representing the stay frequency of the moving objects for each of a plurality of division areas defined by segmenting the target area.

According to this structure, a user can grasp at a glance a state of distribution of the stay frequency of the moving objects in the target area.

In a seventh aspect of the present invention, the heat map generation unit varies at least one of visualization elements of the heat map including hue, shade, and pattern image to visualize the state of distribution of the stay frequency of the moving objects.

According to this structure, a user can readily grasp the state of distribution of the stay frequency of the moving objects.

In an eighth aspect of the present invention, the heat map generation unit generates a point-to-point heat map visualizing a movement frequency of the moving objects between two points in the target area.

According to this structure, a user can grasp at a glance a state of movement of the moving objects between two points.

In a ninth aspect of the present invention, there is provided a staying state analysis system for measuring a stay frequency of moving objects in a target area and generating a heat map visualizing a state of distribution of the stay frequency for display on a display device, the system including: a moving object detection device that detects moving objects in the target area and outputs pieces of position information of the moving objects; the display device that displays the heat map; and a plurality of information processing devices, wherein the plurality of information processing devices jointly include: a position information sorting unit that sorts the pieces of position information of the moving objects obtained from the moving object detection device in accordance with a degree of possibility that the pieces of position information may include an error due to a missing part that may be created in traffic lines of the moving objects; a missing part position detection unit that detects a position of the missing part in the traffic lines based on at least two groups of pieces of position information sorted by the position information sorting unit; a corrected distribution information generation unit that generates corrected distribution information representing the stay frequency of the moving objects corrected based on a result of detection by the missing part position detection unit; and a heat map generation unit that generates the heat map based on the corrected distribution information generated by the corrected distribution information generation unit.

According to this structure, similarly to the structure according to the first aspect of the present invention, it is possible, even in a situation where traffic lines may include a missing part, to generate a highly accurate heat map by making appropriate corrections.

In a tenth aspect of the present invention, there is provided a staying state analysis method for performing, with an information processing device, a process of measuring a stay frequency of moving objects in a target area and generating a heat map visualizing a state of distribution of the stay frequency for display on a display device, the method including: sorting pieces of position information of the moving objects obtained from a moving object detection device in accordance with a degree of possibility that the pieces of position information may include an error due to a missing part that may be created in traffic lines of the moving objects; detecting a position of the missing part in the traffic lines based on at least two groups of pieces of position information sorted by the sorting; generating corrected distribution information representing the stay frequency of the moving objects corrected based on a result of the detecting; and generating the heat map based on the corrected distribution information.

According to this structure, similarly to the structure according to the first aspect of the present invention, it is possible, even in a situation where traffic lines may include a missing part, to generate a highly accurate heat map by making appropriate corrections.

BRIEF DESCRIPTION OF THE DRAWINGS

Now the present invention is described in the following in terms of preferred embodiments thereof with reference to the appended drawings, in which:

FIG. 12 is an explanatory diagram for explaining examples of a traffic line missing pattern in which a missing part is created in a traffic line;

DETAILED DESCRIPTION OF THE PREFERRED EMBODIMENTS

In the following, embodiments of the present invention will be described with reference to the drawings.

Figure 1:
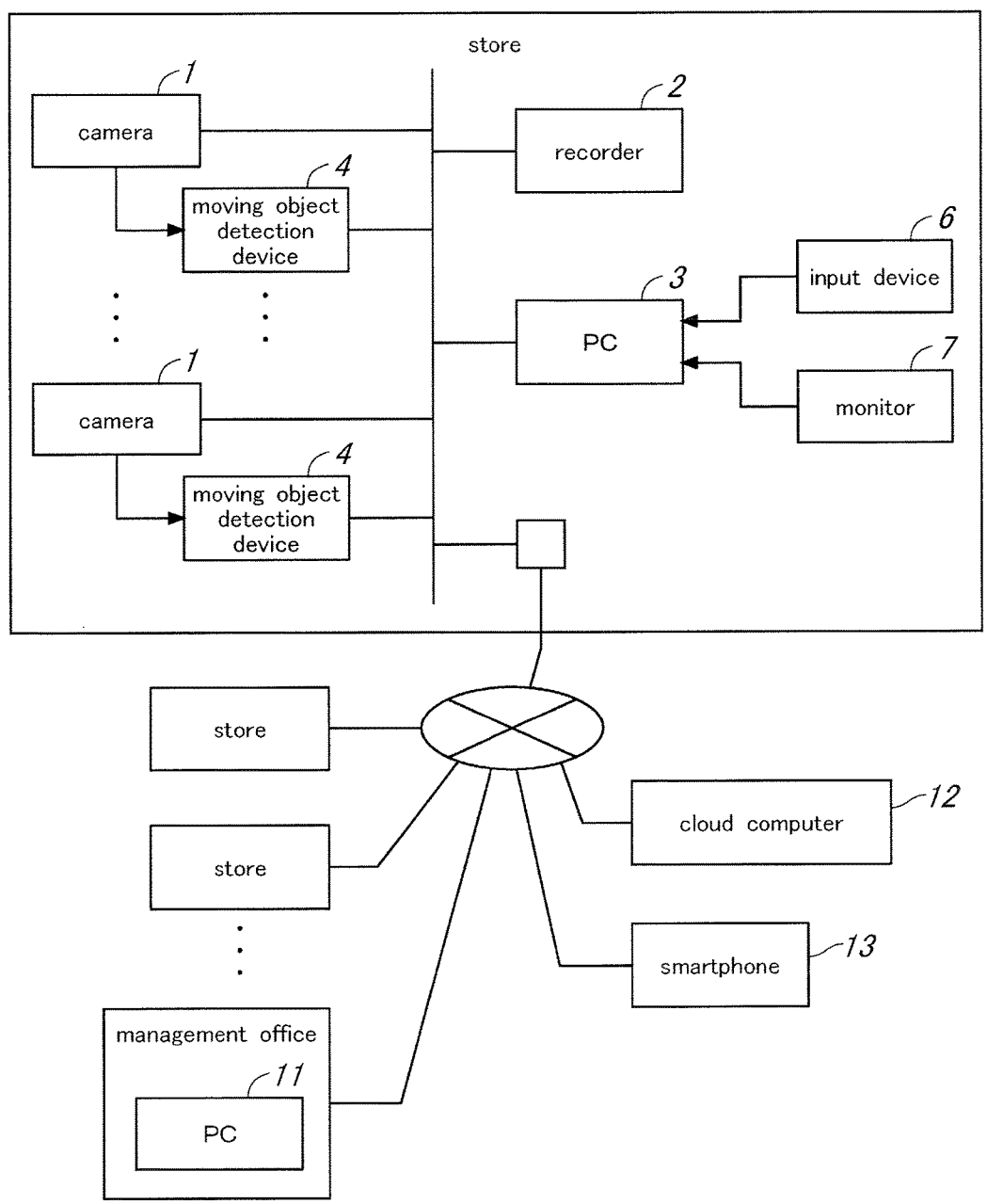
FIG. 1 is a diagram showing an overall configuration of a staying state analysis system according to an embodiment of the present invention.

FIG. 1 is a diagram showing an overall configuration of a staying state analysis system according to an embodiment of the present invention. This staying state analysis system is designed for retail stores such as a supermarket or the like, and includes cameras 1, a recorder (image storing device) 2, a personal computer (PC) (staying state analysis device) 3 and moving object detection devices 4.

The cameras 1 are mounted at appropriate positions in a store to capture images of a monitored area in the store, and image information obtained thereby is recorded in the recorder 2.

The PC 3 is connected with an input device 6 such as a mouse for a user such as a monitoring person to perform a variety of input operations, and a monitor (display device) 7 on which a monitoring screen is displayed. It is to be noted that the input device 6 and the monitor 7 may be embodied as a touch panel display.

The PC 3 is set up in a security station or the like of the store, and causes the monitor 7 to display a monitoring screen which enables the monitoring person (such as a security guard) to view the real-time image of an interior of the store taken by the cameras 1 or the past image of the interior of the store recorded in the recorder 2.

A PC 11 installed in a management office is also connected with a monitor not shown in the drawings, such that a user at the management office can check the situation in the store by viewing the real-time image of the interior of the store taken by the cameras 1 or the past image of the interior of the store recorded in the recorder 2.

Each moving object detection device 4 performs a person detection process; namely, a process of detecting a person(s) (moving object) from frames of images captured by a corresponding camera 1, and outputs position information of the person(s) at each time of capture of the frames. This person detection process may be performed by use of known image recognition technology.

Figure 2:
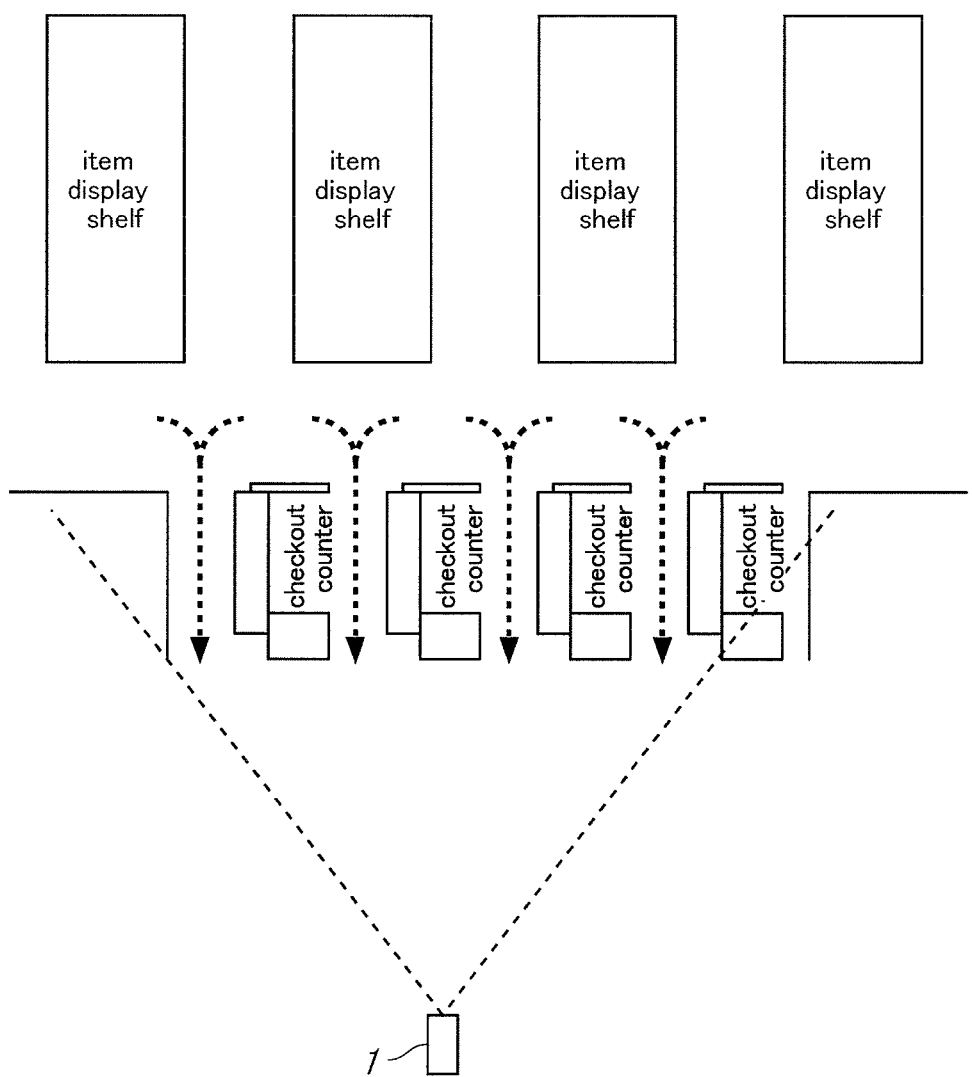
FIG. 2 is a plan view showing an exemplary position of a camera 1 in a store.

FIG. 2 is a plan view showing an exemplary position of a camera 1 in the store. Item display shelves and checkout counters are placed in the store, and the camera 1 is mounted to take images of the checkout counters. Customers pick desired items from the item display shelves and make payment at the checkout counters. The customers approach the checkout counters from an item display area where the item display shelves are arranged, and leave the checkout counters after making payment. The camera 1 takes images of the customers approaching the checkout counters from the front, and based on the images taken by the camera 1, person detection can be performed.

Figure 3:
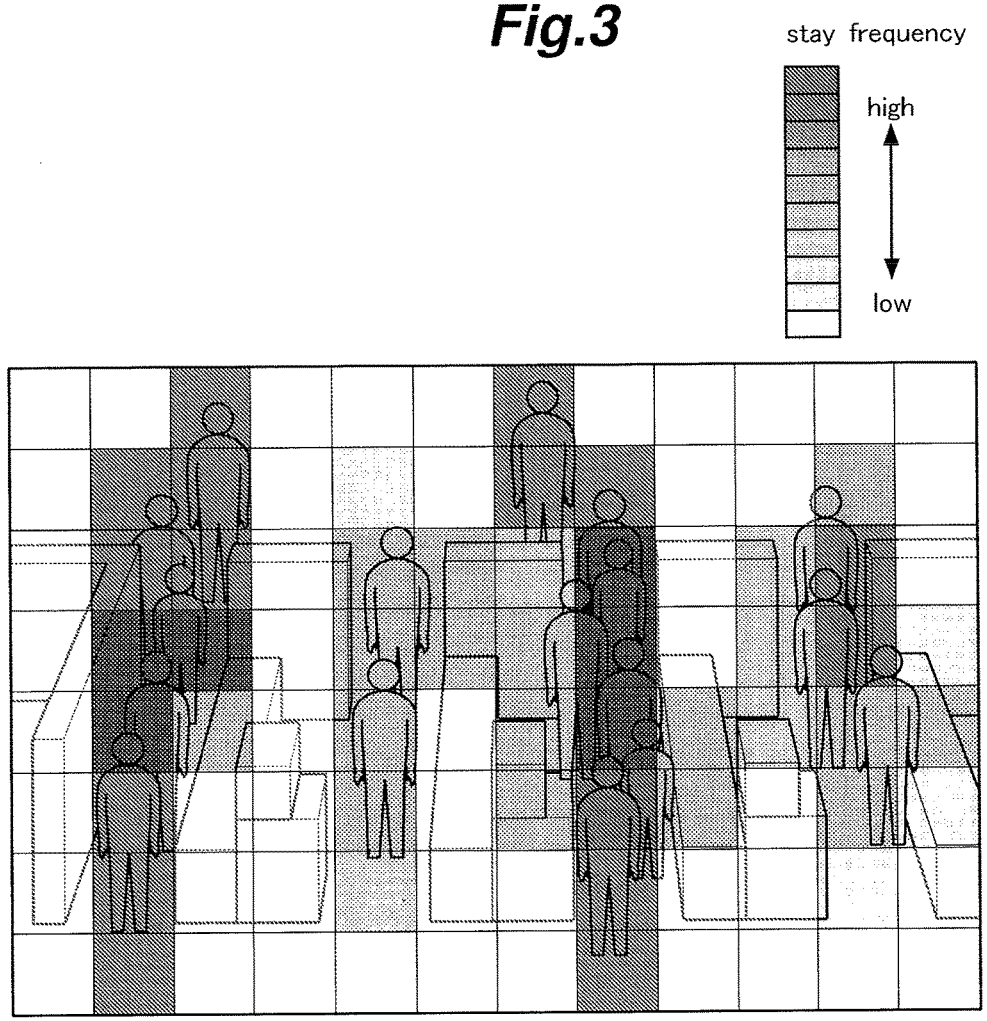
FIG. 3 is an explanatory diagram showing a segmented heat map generated by a personal computer (PC) 3 and displayed on a monitor 7.

Next, a description will be given of a heat map generated by a staying state analysis process performed by the PC 3 shown in FIG. 1. FIG. 3 is an explanatory diagram showing a segmented heat map generated by the PC 3 shown in FIG. 1 and displayed on the monitor 7.

The images obtained by the camera 1 include images of persons performing checkout at the checkout counters, and these persons approach the checkout counters from the entrance side, namely, the back side (or far side) of the checkout counters remote from the camera 1, and leave the checkout counters from the exit side, namely, the front side (or near side) of the checkout counters close to the camera 1. Accordingly, a flow of persons moving from the entrance side to the exit side is formed around each checkout counter, and if a delay is caused in the checkout process at the checkout counter or the number of customers (persons) exceeds that which can be handled by the store staff performing checkout, a queue of persons waiting for checkout is formed and staying of persons occurs.

Thus, in the present embodiment, to grasp the degree of staying of persons around the checkout counters, a stay frequency of persons (number of staying persons detected per unit time) in a target area is measured, and a segmented heat map visualizing a state of distribution of the stay frequency is generated. In this segmented heat map, the target area (imaging area of the camera) is divided into multiple grid cells (division areas), and the stay frequency of persons for each grid cell is displayed. It is to be noted that in the screen displayed on the monitor 7, the image of the heat map is displayed superimposed on the image of the target area, where the image of the heat map is transparent or translucent.

To generate the heat map, distribution information representing the stay frequency of persons for each grid cell is generated beforehand. Specifically, the number of traffic lines of persons passing through each grid cell per unit time is counted to obtain the number of persons staying in each grid cell per unit time, namely, the stay frequency for each grid cell.

Further, in this heat map, at least one of the visualization elements including hue, shade (darkness) and pattern image is varied depending on the stay frequency of persons (number of staying persons detected per unit time) to visualize the state of distribution of the stay frequency of persons. In the example shown in FIG. 3, the stay frequency of persons in each grid cell is expressed by the shade of the grid cell (darkness of the fill color).

Figure 4:
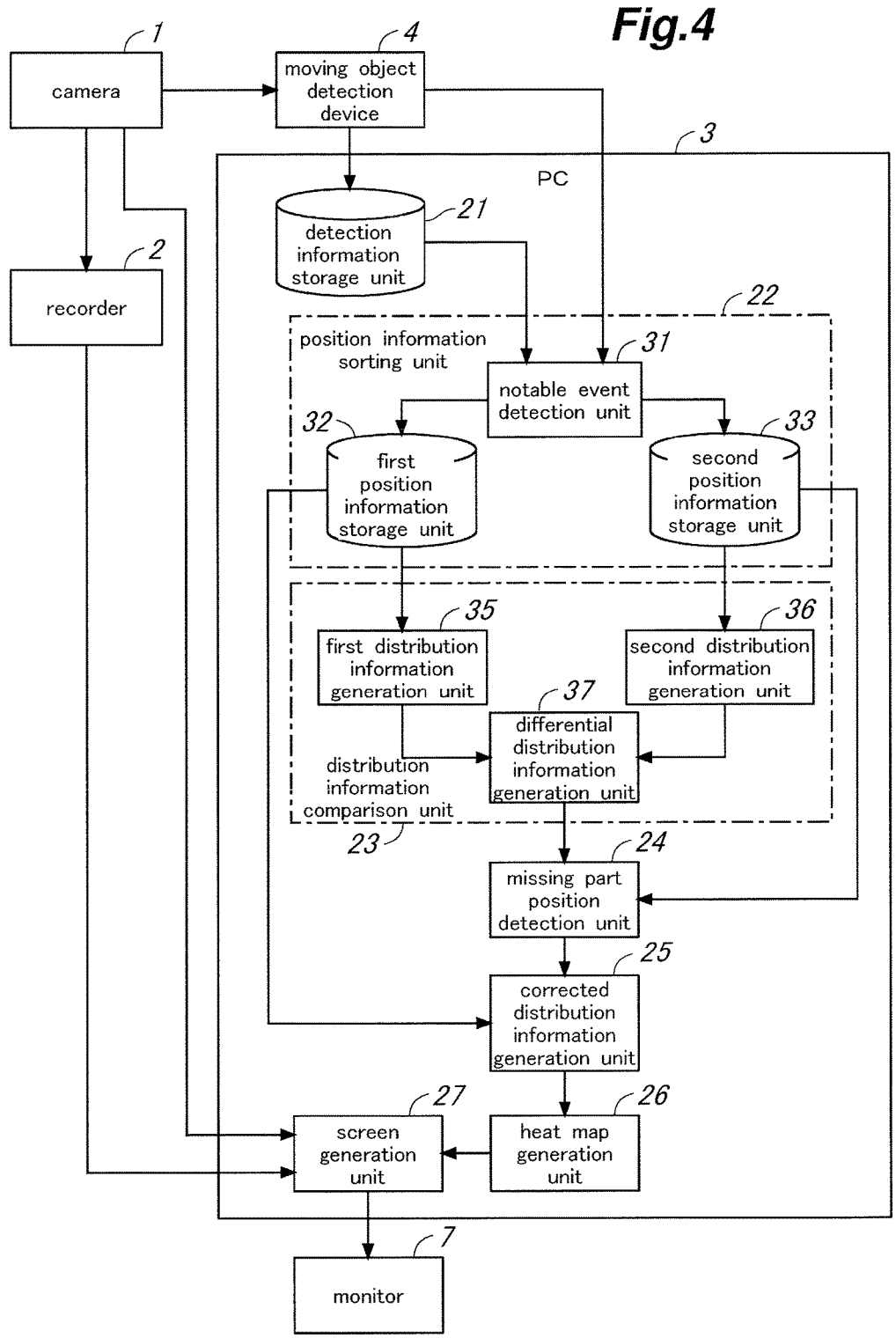
FIG. 4 is a block diagram schematically showing a functional structure of the PC 3.

Next, a description will be given of the staying state analysis process performed by the PC 3 shown in FIG. 1. FIG. 4 is a block diagram schematically showing a functional structure of the PC 3. It is to be noted that FIG. 4 shows only one camera 1 and one moving object detection device 4 for the sake of simplicity, though the system may include multiple cameras 1 and moving object detection devices 4, as shown in FIG. 1.

The PC 3 includes a detection information storage unit 21, a position information sorting unit 22, a distribution information comparison unit 23, a missing part position detection unit 24, a corrected distribution information generation unit 25, a heat map generation unit 26 and a screen generation unit 27.

The detection information storage unit 21 cumulatively stores the position information of persons obtained by the moving object detection device 4. The position information includes a detection position of each person detected in each frame of image captured by the camera 1 and a detection time of each person obtained from the time of capture of the frame in which the person is detected. It is also to be noted that a traffic line can be obtained by connecting the detection positions included in pieces of position information associated with a same person in chronological order, but information of the line segments (vectors) connecting the detection positions is not necessarily required.

The position information sorting unit 22 sorts the pieces of position information of persons obtained for respective detection times (frames) in accordance with the degree of possibility that the pieces of position information may include an error due to a missing part that may be included in the traffic lines of persons. The position information sorting unit 22 includes a notable event detection unit 31, a first position information storage unit 32 and a second position information storage unit 33.

The notable event detection unit 31 performs a process of detecting a notable event, which is an event that may cause a missing part to be created in the traffic lines of persons, i.e., an even that makes the person detection performed by the moving object detection device 4 tend to be erroneous. This notable event detection process is performed based on the position information generated by the moving object detection device 4. More specifically, in a case where the process is performed based on the past data, the notable event detection unit 31 obtains the position information from the detection information storage unit 21, while in a case where the process is performed in real time, the notable event detection unit 31 obtains the position information from the moving object detection device 4.

Particularly, in the present embodiment, a congestion event in which multiple persons are present densely and a queuing event in which multiple persons are standing in a queue are detected as a notable event. When multiple persons are present densely or multiple persons are standing in a queue, occlusions between persons tend to occur and the accuracy of the person detection tends to be lowered, and thus, there is a possibility that a missing part may be created in the traffic lines of persons. It is to be noted that even when the target area is not congested, if multiple persons form a queue, an occlusion between persons tend to occur. Conversely, even when there is no queue formed, if the target area is congested with persons, occlusions between persons tend to occur. Thus, in the present embodiment, the congestion event and the queuing event are detected independently, and when at least one of them is detected, it is determined that there is a possibility that a missing part may be created in the traffic lines of persons.

The pieces of position information of persons obtained for respective detection times (frames) are sorted in accordance with the result of detection by the notable event detection unit 31 and are cumulatively stored in either or both of the first position information storage unit 32 and the second position information storage unit 33. Specifically, the pieces of position information obtained when a notable event was not detected are stored in both the first position information storage unit 32 and the second position information storage unit 33, while the pieces of position information obtained when a notable event was detected are stored in only the second position information storage unit 33.

The distribution information comparison unit 23 generates two sets of distribution information for comparison, each representing a state of distribution of the stay frequency of persons, respectively from the two groups of pieces of position information sorted by the position information sorting unit 22, and compares the two sets of distribution information for comparison with each other. The distribution information comparison unit 23 includes a first distribution information generation unit 35, a second distribution information generation unit 36 and a differential distribution information generation unit 37.

The first distribution information generation unit 35 performs a process of generating first distribution information (distribution information for comparison) from the pieces of position information stored in the first position information storage unit 32, namely, the pieces of position information obtained when no notable event was detected by the notable event detection unit 31. The second distribution information generation unit 36 performs a process of generating second distribution information (distribution information for comparison) from the pieces of position information stored in the second position information storage unit 33, namely, the pieces of position information obtained when a notable event was detected by the notable event detection unit 31. In the distribution information obtaining process performed by each of the first distribution information generation unit 35 and the second distribution information generation unit 36, based on the respective groups of pieces of position information, the traffic lines present in each grid cell are counted to thereby obtain the number of traffic lines present in each grid cell per unit time, namely, the stay frequency (number of staying persons per unit time) for each grid cell.

The differential distribution information generation unit 37 performs a process of generating differential distribution information representing a difference between the first distribution information generated by the first distribution information generation unit 35 and the second distribution information generated by the second distribution information generation unit 36. In this differential distribution information generation process, a difference between the stay frequency for each grid cell in the first distribution information and the stay frequency for a corresponding grid cell in the second distribution information is calculated.

The missing part position detection unit 24 performs a process of detecting a position of a missing part in a traffic line(s) based on the result of comparison by the distribution information comparison unit 23, namely, based on the differential distribution information generated by the differential distribution information generation unit 37. In this missing part position detection process, first, grid cells (area segments) in which a missing part may be created in one or more traffic lines are picked up based on the differential distribution information, and then, further analysis is performed on these grid cells to find the position(s) where a missing part is actually created in a traffic line(s).

The corrected distribution information generation unit 25 performs a process of generating corrected distribution information in which the stay frequency of persons (number of staying persons detected per unit time) has been corrected based on the result of detection by the missing part position detection unit 24. Specifically, in the present embodiment, some of the pieces of position information stored in the second position information storage unit 33, i.e., the pieces of position information obtained when a notable event was found by the notable event detection unit 31, are corrected taking into account the position of the missing part in one or more traffic lines detected by the missing part position detection unit 24, and the corrected distribution information is generated based on the pieces of corrected position information and the pieces of uncorrected position information stored in the second position information storage unit 33. In the corrected distribution information obtaining process, based on the pieces of position information, the traffic lines present in each grid cell are counted to thereby obtain the number of traffic lines in each grid cell per unit time, namely, the stay frequency (number of staying persons per unit time) for each grid cell.

In the position information correction process performed by the corrected distribution information generation unit 25, some pieces of position information are corrected such that two traffic lines, which were generated due to a missing part in a traffic line that should be treated as a single line, are connected together; namely, the two traffic lines, which were associated with different persons, are made associated with a same person. If necessary, it is possible to obtain a connection line connecting two traffic lines that should be connected with each other, and correct the position information to represent the state of the two traffic lines connected by the connection line.

The heat map generation unit 26 performs a process of generating heat map information based on the corrected distribution information generated by the corrected distribution information generation unit 25. In this heat map generation process, information is generated for causing at least one of visualization elements including hue, shade and pattern image to be varied depending on the stay frequency of persons (number of staying persons detected per time unit), to visualize the state of distribution of the stay frequency of persons.

The screen generation unit 27 performs a process of generating screen information for causing the monitor 7 to display the heat map information generated by the heat map generation unit 26. Specifically, in the present embodiment, the screen generation unit 27 generates, based on the heat map information generated by the heat map generation unit 26 and the image information from the camera 1 or the recorder 2, screen information relating to a display image in which the heat map image is superimposed on the image of the target area.

It is to be noted that the various units of the PC 3 shown in FIG. 4 are realized by executing programs for staying state analysis by the CPU of the PC 3. These programs may be pre-installed in the PC 3 serving as an information processing device to embody a device dedicated to staying state analysis, or may be provided to a user in the form stored in an appropriate program recording medium as an application program that can be run on a general-purpose OS.

Figure 5:
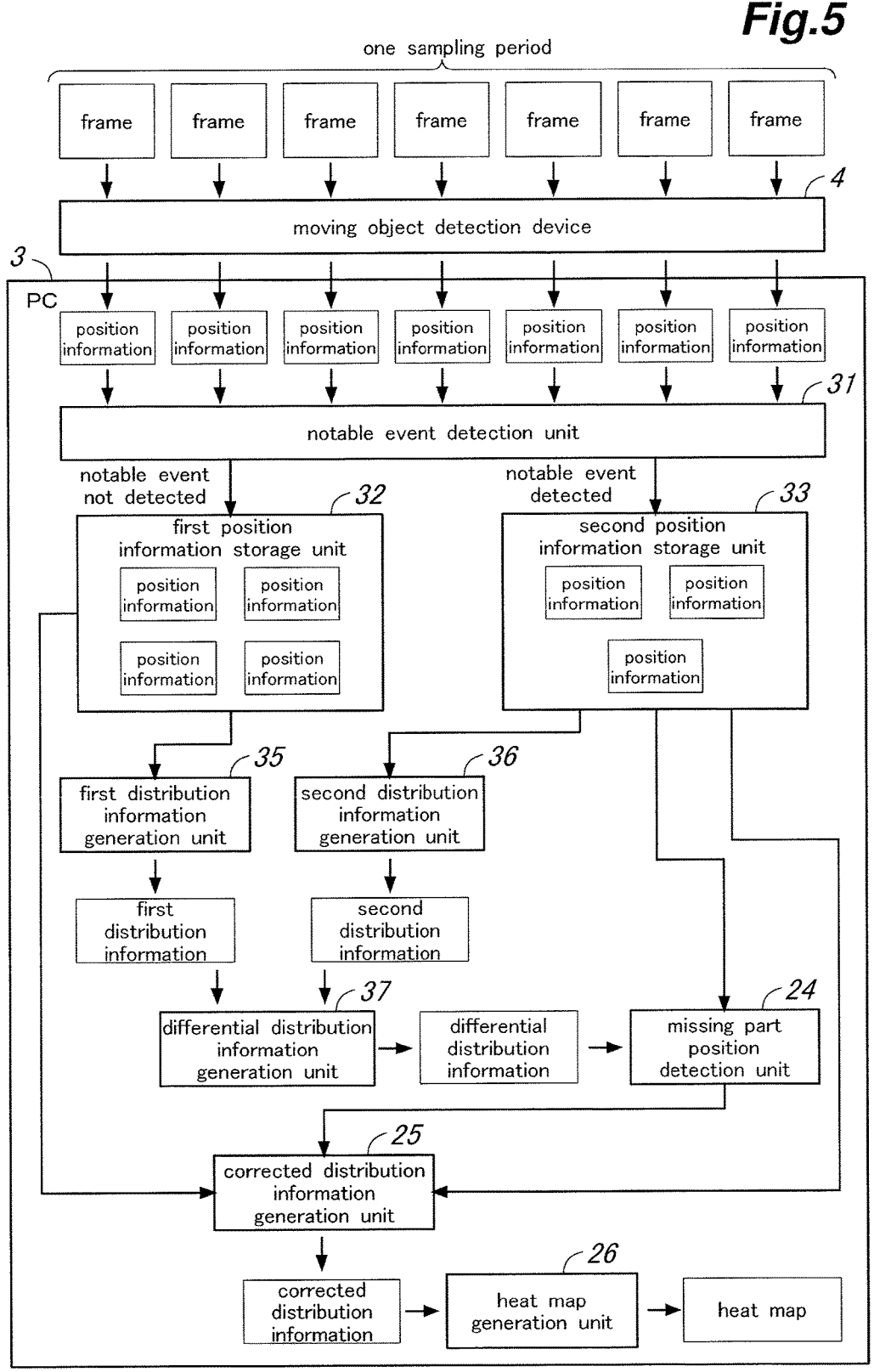
FIG. 5 is an explanatory diagram for explaining an overview of a staying state analysis process performed by the PC 3.
Figure 6:
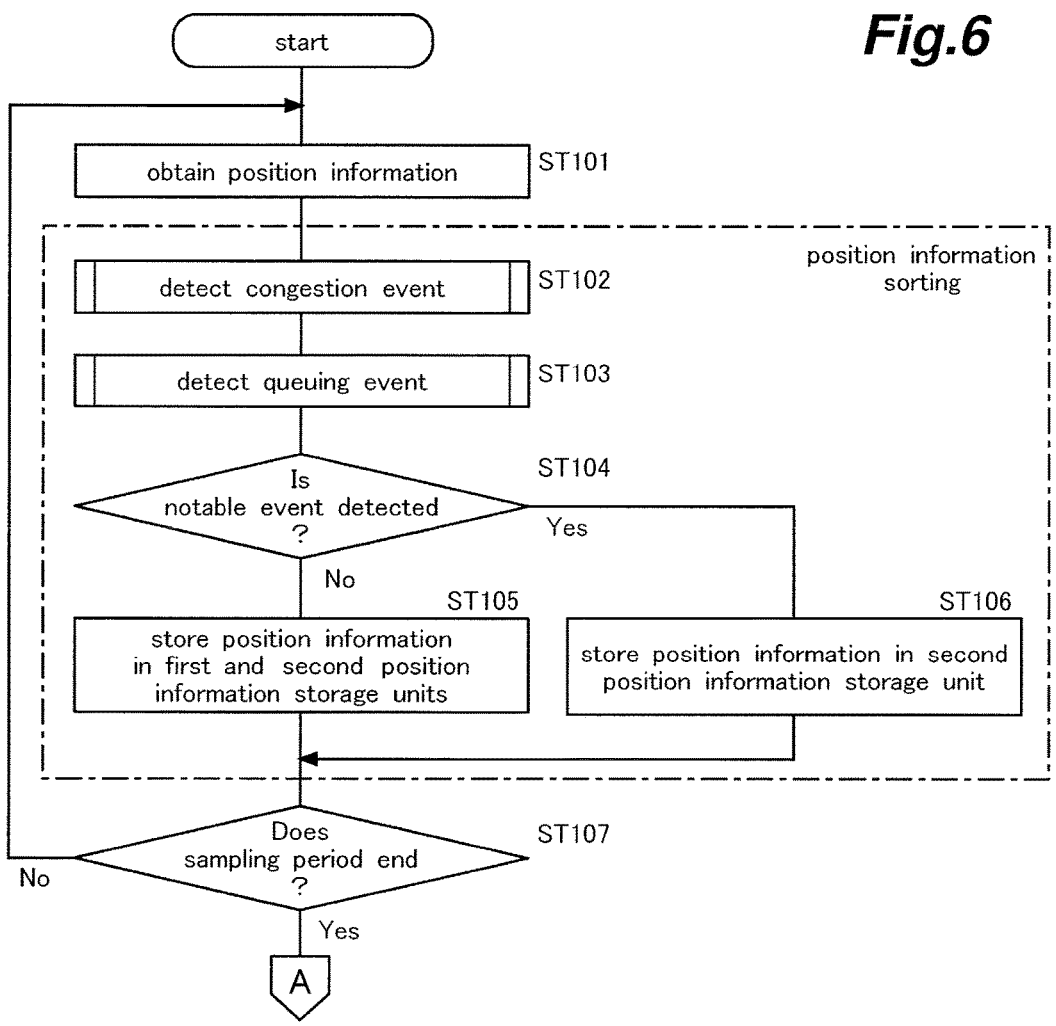
FIG. 6 is a flowchart showing the steps in the staying state analysis process performed by the PC 3.
Figure 7:
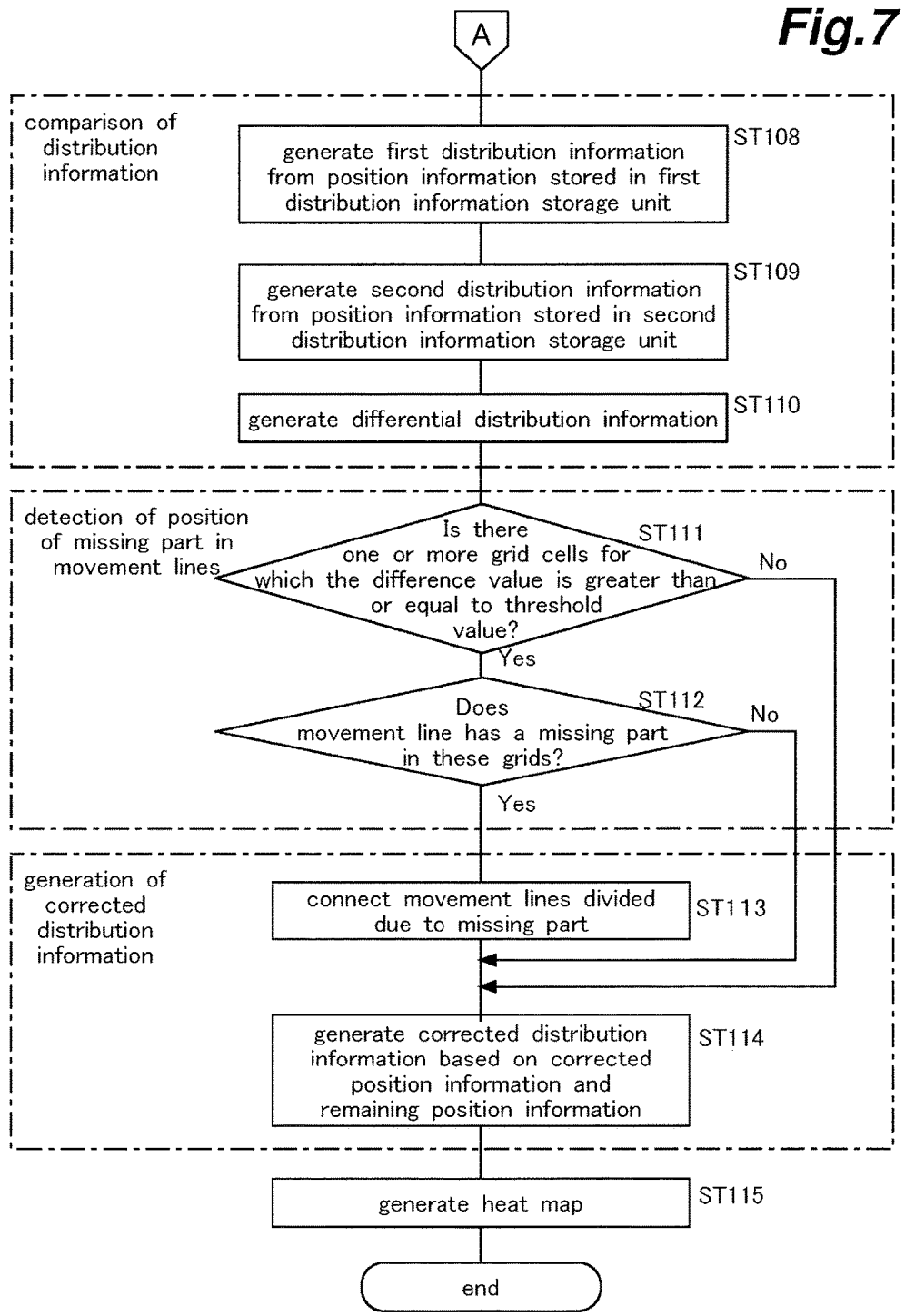
FIG. 7 is a flowchart showing the steps in the staying state analysis process performed by the PC 3.

Next, a description will be given of an overall procedure of the staying state analysis process performed by the PC 3 shown in FIG. 4. FIG. 5 is an explanatory diagram for explaining an overview of the staying state analysis process performed by the PC 3. FIG. 6 and FIG. 7 are flowcharts jointly showing the steps in the staying state analysis process performed by the PC 3.

As shown in FIG. 5, the moving object detection device 4 performs a process of detecting the positions of persons from the frames of images input sequentially from the camera 1, and outputs pieces of position information of the persons on a frame (detection time) basis.

The PC 3 obtains the pieces of position information from the moving object detection device 4 on the frame-by-frame basis (ST101 in FIG. 6), and the notable event detection unit 31 performs a process of detecting a notable event (congestion event and queuing event) from the pieces of position information (ST102 and ST103 in FIG. 6). If no notable event is detected (NO in ST104 in FIG. 6), the pieces of position information are cumulatively stored in the first position information storage unit 32 (ST105 in FIG. 6) and the second position information storage unit 33, and if a notable event is detected (YES in ST104 in FIG. 6), the pieces of position information are cumulatively stored in the second position information storage unit 33 (ST106 in FIG. 6).

These processes are performed repeatedly for the pieces of position information obtained on the frame basis until a sampling period ends, where the sampling period is a period to collect data for generating one heat map (ST107 in FIG. 6). Namely, the heat map generation unit 26 generates one heat map based on the pieces of position information detected from multiple frames within a predetermined sampling period, and the first position information storage unit 32 and the second position information storage unit 33 cumulatively store the pieces of position information collected during one sampling period.

Subsequently, the first distribution information generation unit 35 performs a process of generating first distribution information from the pieces of position information stored in the first position information storage unit 32 during one sampling period (ST108 in FIG. 7), and the second distribution information generation unit 36 performs a process of generating second distribution information from the pieces of position information stored in the second position information storage unit 33 during one sampling period (ST109 in FIG. 7). Then, the differential distribution information generation unit 37 performs a process of generating differential distribution information, which is a difference between the first distribution information and the second distribution information (ST110 in FIG. 7).

Subsequently, a missing part position detection process is performed by the missing part position detection unit 24. In the missing part position detection process, first, the difference values included in the differential distribution information, where the difference values are obtained for respective grid cells, are each compared with a predetermined threshold value to determined whether there is one or more grid cells for which the difference value is greater than or equal to the threshold value (ST111 in FIG. 7). If the difference value for a certain grid cell is greater than or equal to the threshold value, there is a possibility that some traffic lines in the grid cell include a missing part, and thus, based on the above determination, it is possible to pick up the grid cells in which a missing part may be included in one or more traffic lines. Thus, if there is one or more grid cells for which the difference value is greater than or equal to the threshold value (YES in ST111 in FIG. 7), it is determined whether there actually is a missing part in the traffic line(s) in each of these grid cells (ST112 in FIG. 7).

If the grid cell(s) in which a missing part of a traffic line is located is(are) identified by the above determination, then, a process of generating corrected distribution information is performed by the corrected distribution information generation unit 25. In this corrected distribution information generation process, first, a process of connecting two traffic lines divided by a missing part into one is performed (ST113 in FIG. 7). This process includes a position information correction process, in which, of the pieces of the position information stored in the second position information storage unit 33, the pieces of position information corresponding to the position of a missing part(s) included in the traffic line(s) are corrected such that two traffic lines which have been associated with different persons due to the missing part are made associated with a same person. Thereafter, corrected distribution information is generated based on the pieces of corrected position information and the remaining pieces of position information, namely, the pieces of uncorrected position information stored in the second position information storage unit 33 (ST114 in FIG. 7).

Then, the heat map generation unit 26 performs a process of generating a heat map from the corrected distribution information generated by the corrected distribution information generation unit 25 (ST115 in FIG. 7).

It is to be noted that if no grid cell in which a missing part of a traffic line is located is found in the missing part position detection process, no correction is made to the pieces of position information stored in the second position information storage unit 33, and distribution information is generated from the pieces of position information stored in the first position information storage unit 32 and the pieces of position information stored in the second position information storage unit 33.

After one heat map is generated as described above, then, a process of generating a heat map of the next time slot is started, and this process is repeated to generate multiple heat maps in chronological order. By displaying these heat maps on the monitor 7 in order, it is possible to enable a user to readily understand the temporal change in the stay frequency of persons.

Figure 8:
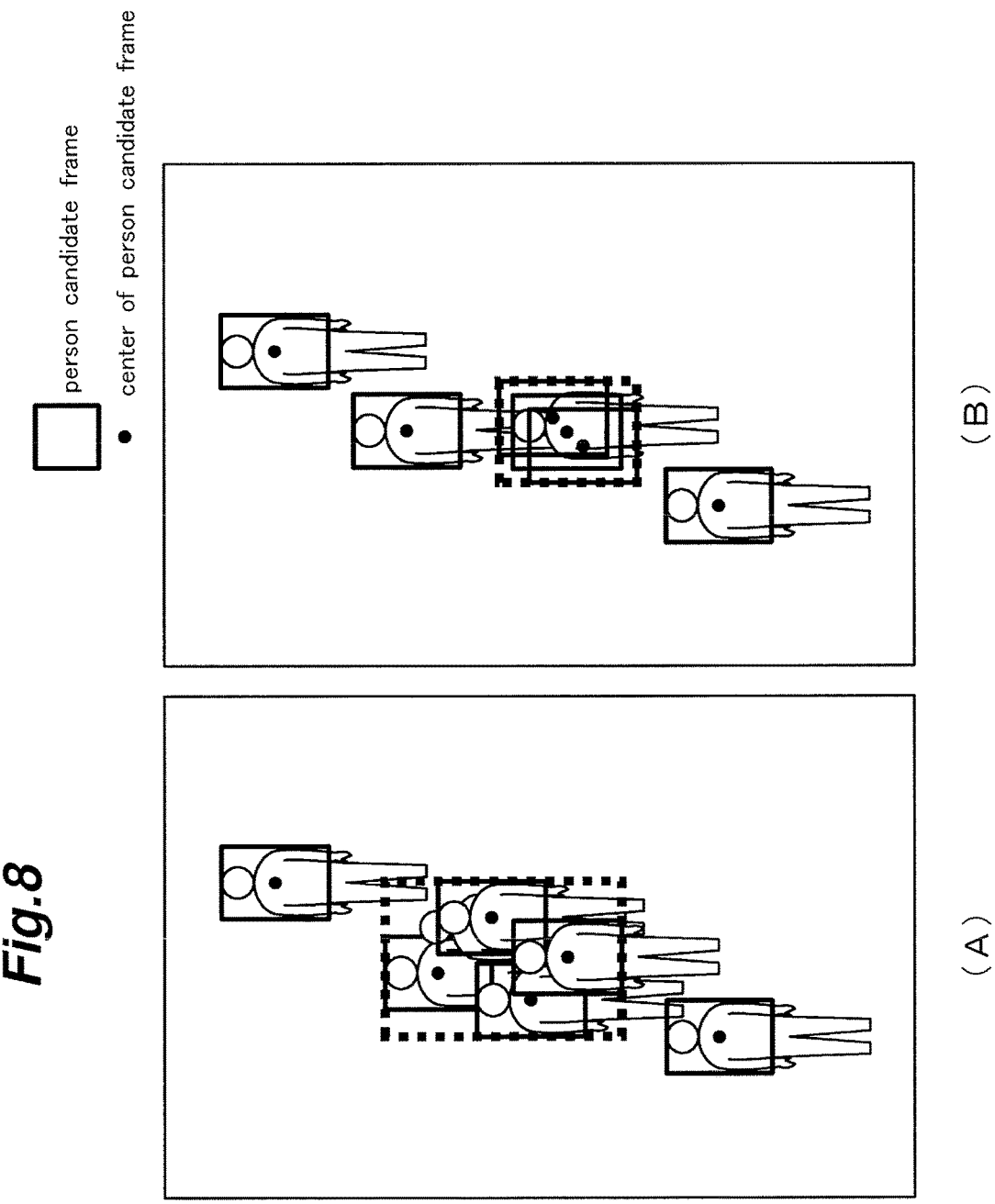
FIG. 8 is an explanatory diagram for explaining an overview of a congestion event detection process performed by a notable event detection unit 31.

Next, a description will be given of the congestion event detection process (ST102 in FIG. 6) performed by the notable event detection unit 31 shown in FIG. 4. FIG. 8 is an explanatory diagram for explaining an overview of the congestion event detection process performed by the notable event detection unit 31.

The person detection process performed by the moving object detection device 4 includes a process of setting, as intermediate information, a person candidate frame to a region where it is estimated by the image analysis that a person is present. If there is a region congested with persons in the target area, as shown in part (A) of FIG. 8, the person candidate frames are disposed densely in the congested region but a certain distance tends to be placed between adjacent ones of the person candidate frames in the congested region.

On the other hand, when the accuracy of the person detection is low, multiple persons candidate frames may be set to a single person, as shown in part (B) of FIG. 8. In this case, in comparison to the case where a region is congested with persons as shown in part (A) of FIG. 8, though the person candidate frames are disposed densely in a similar manner, the person candidate frames appear differently; particularly, the degree of variance of the positions of the person candidate frames is different.

Thus, in the present embodiment, person candidate frames that are close to each other are grouped, the variance of the positions of the person candidate frames in each group is calculated, and when the variance is large, it is determined that there are many persons present in a specific region; namely, a congestion event has occurred.

Figure 9:
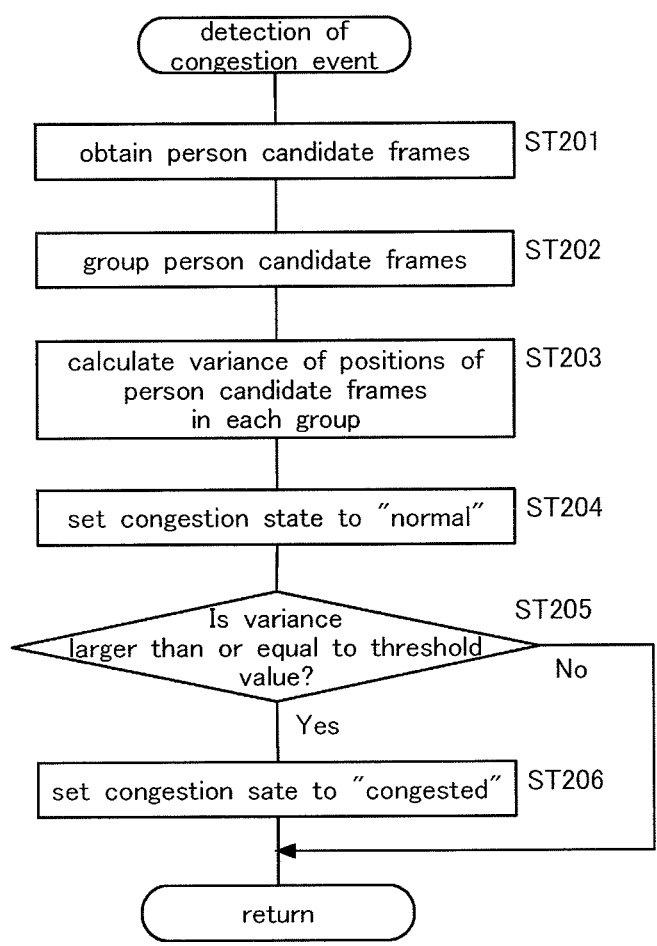
FIG. 9 is a flowchart showing the steps in the congestion event detection process performed by the notable event detection unit 31.

Next, a description will be given of the steps in the congestion event detection process performed by the notable event detection unit 31 shown in FIG. 4. FIG. 9 is a flowchart showing the steps in the congestion event detection process performed by the notable event detection unit 31.

In this process, first, pieces of position information including the information relating to the person candidate frames from the moving object detection device 4 (ST201), and person candidate frames that are close to each other are grouped (ST202). At this time, a comparison is made between the coordinate value of the center point of one person candidate frame to the coordinate value of the center point of another person candidate frame, such that when the distance between the center points of two person candidate frames is smaller than a predetermined threshold value, they are brought together in a group.

Subsequently, the variance of the positions of the person candidate frames in each group is calculated (ST203). At this time, the variance of the X-coordinate values of the center points of the person candidate frames as well as the variance of the Y-coordinate values of the center points of the person candidate frames are calculated. Then, after setting the state information relating to the congestion to "normal" (ST204), it is determined whether the variation of the positions of the person candidate frames in each group is larger than or equal to a threshold value (ST205), so that if the variance of the positions of the person candidate frames is larger than or equal to the threshold value (YES in ST205), the state information relating to congestion is set to "congested" (ST206). On the other hand, if the variance of the positions of the person candidate frames is smaller than the threshold value (NO in ST205), the state information relating to congestion remains "normal."

Figure 10:
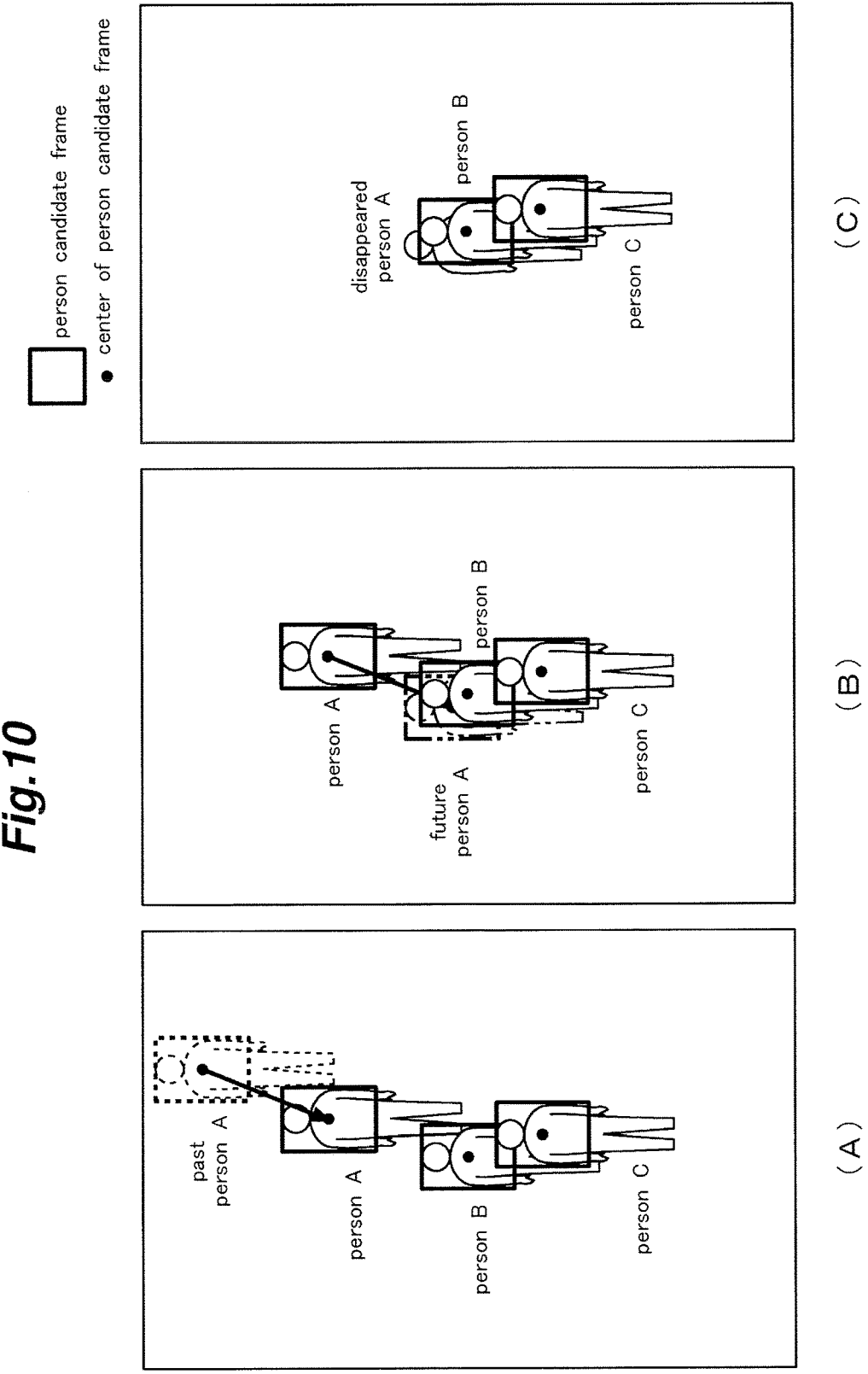
FIG. 10 is an explanatory diagram for explaining an overview of a queuing event detection process performed by the notable event detection unit 31.

Next, a description will be given of the queuing event detection process (ST103 in FIG. 6) performed by the notable event detection unit 31 shown in FIG. 4. FIG. 10 is an explanatory diagram for explaining an overview of the queuing event detection process performed by the notable event detection unit 31.

A queue is formed when persons come to stand in line one after another behind a person standing still to wait for services or the like. Thus, in the present embodiment, it is determined first whether each detected person is moving. In the example shown in part (A) of FIG. 10, person A is moving while persons B and C are stationary. Next, as shown in part (B) of FIG. 10, a future position of moving person A is predicted from the past movement of person A. If the predicted moving position of moving person A and the position of stationary person B are close to each other, person A is set as a queue candidate. Subsequently, if, after a predetermined period of time has elapsed, moving person A disappears as shown in part (C) of FIG. 10, it is determined that person A has come to stand in line behind person B and the detection of person A failed due to an occlusion between the persons, and hence, it is determined that a queue is formed.

Figure 11:
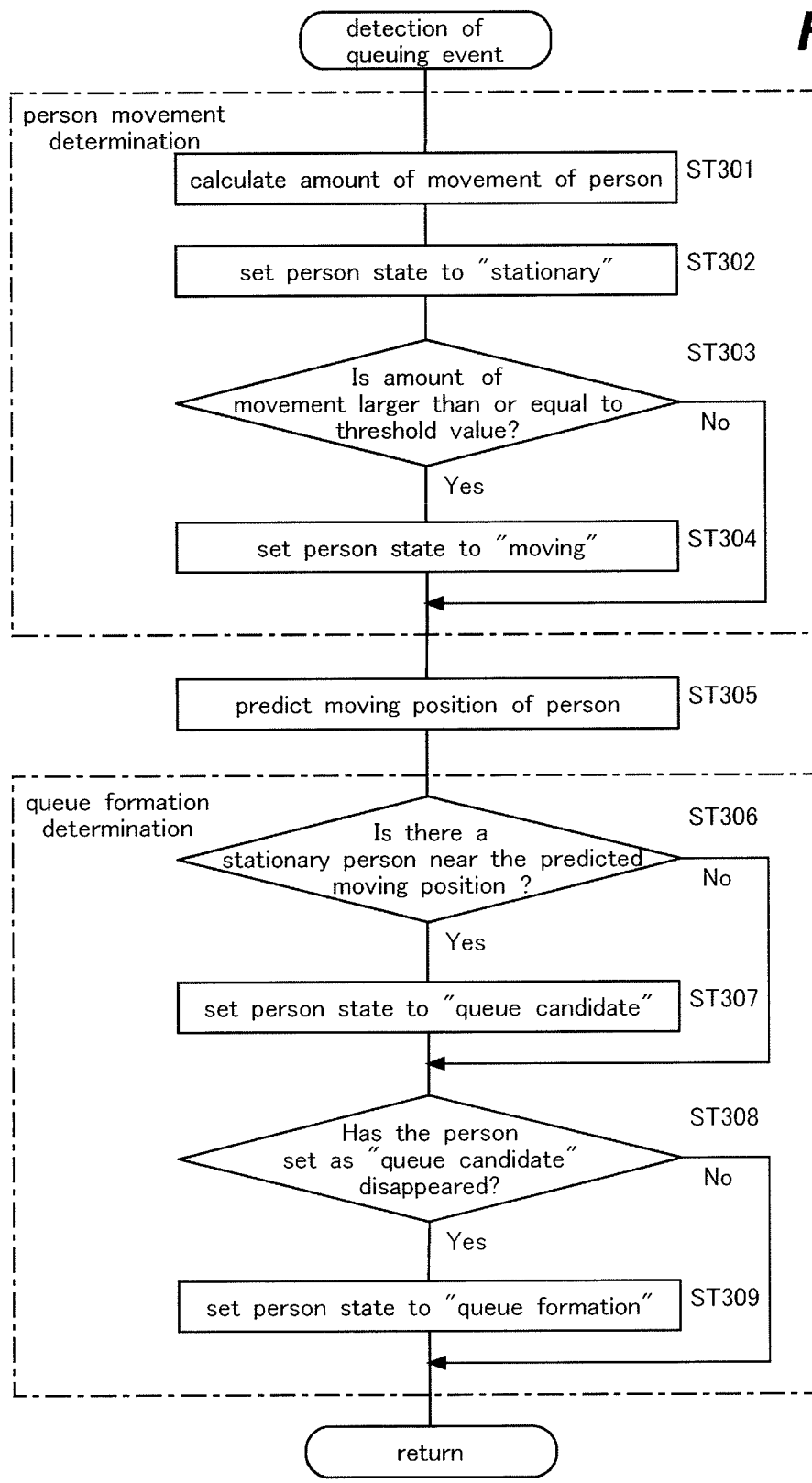
FIG. 11 is a flowchart showing the steps in the queuing event detection process performed by the notable event detection unit 31.

Next, a description will be given of the steps in the queuing event detection process performed by the notable event detection unit 31 shown in FIG. 4. FIG. 11 is a flowchart showing the steps in the queuing event detection process performed by the notable event detection unit 31.

In this process, first, a person movement determination is performed to determine whether each detected person is moving. In this person movement determination, first, based on the past coordinate values of a person of interest, an amount of movement of the person is calculated (ST301). Then, after the person's state information is set to "stationary" (ST302), it is determined whether or not the amount of movement is larger than or equal to a threshold value (ST303), and if the amount of movement is larger than or equal to the threshold value (YES in ST303), the person's state information is set to "moving" (ST304). On the other hand, if the amount of movement is less than the threshold value (NO in ST303), the person's state information remains to be set to "stationary."

Subsequently, a process of predicting the future position of the person of interest from the past coordinate values of the person of interest (ST305).

Thereafter, a queue formation determination is performed; namely, it is determined whether the person of interest has formed or joined a queue. In this queue formation determination, it is determined first whether there is a stationary person near the predicted moving position of the person of interest (ST306), and if there is a stationary person near the predicted moving position of the person of interest (YES in ST306), the state information of the person of interest is set to "queue candidate" (ST307).

Subsequently, it is determined whether the detection of the person set as a queue candidate in the foregoing process has failed and the person has disappeared (ST308), and if the person set as a queue candidate has disappeared (YES in ST308), it is determined that the person has formed or joined a queue and the person's state information is set to "queue formation" (ST309). On the other hand, if the person set as a queue candidate has not disappeared (NO in ST308), it is determined that the person did not form or join a queue.

It is to be noted that in the illustrated embodiment, it is determined that a queue is formed when the queue formation determination is found positive one time, i.e., when it is determined that a single person comes to stand in line behind another person. However, it is possible to determine that a queue is formed when the queue formation determination is found positive multiple times consecutively, namely, when it is determined that multiple persons come to stand in line one after another.

Next, a description will be given of the process performed by the differential distribution information generation unit 37 and the missing part position detection unit 24 shown in FIG. 4. FIG. 12 is an explanatory diagram for explaining examples of a traffic line missing pattern in which a missing part is created in a traffic line. Specifically, part (A) of FIG. 12 shows a state in which a notable event (congestion or queuing) has occurred, while parts (B-1), (B-2) and (B-3) of FIG. 12 show exemplary traffic line missing patterns.

As shown in part (A) of FIG. 12, when multiple persons are present densely or form a queue around a checkout counter, an occlusion between persons tend to occur, and if an occlusion does occur, the accuracy of the person detection is lowered and a missing part may be created in a traffic line, resulting in a traffic line missing pattern as shown in parts (B-1), (B-2) and (B-3) of FIG. 12.

In the traffic line missing pattern shown in part (B-1) of FIG. 12, a traffic line has a missing part within a single grid cell. In this case, there are two traffic lines in the single grid cell in which the missing part of the traffic line is present, and therefore, multiple counting, i.e., counting the traffic line more than once, occurs in the grid cell.

In the traffic line missing pattern shown in part (B-2) of FIG. 12, a traffic line has a missing part extending over two grid cells. In this case, there is one traffic line in each of the two grid cells in which a portion of the missing part of the traffic line is present, and therefore, no error is caused in the number of traffic lines counted.

In the traffic line missing pattern shown in part (B-3) of FIG. 12, a traffic line has a missing part extending over three grid cells. In this case, of the three grid cells in which a portion of the missing part of the traffic line is present, each of the two end grid cells has one traffic line therein, and thus, no error is caused in the number of traffic lines counted in these grid cells, but the intermediate grid cell has no traffic line therein, and therefore, missed counting, i.e., counting fewer traffic lines, occurs in this grid cell.

It is to be noted that in a case where a traffic line has a missing part extending over four or more grid cells, as is the case with the example shown in part (B-3) of FIG. 12, missed counting occurs in the intermediate grid cells in which no traffic line exists due to the missing part, and the more grid cells the missing part of the traffic line expands over, the wider area the missed counting occurs in.

Thus, in the present embodiment, as described in the following, the differential distribution information generation unit 37 performs a process of generating differential distribution information, which is a difference between the first distribution information and the second distribution information, and based on the differential distribution information, picking up grid cells in which a missing part may be present in the traffic lines, subsequently, the missing part position detection unit 24 performs a process of finding, from the picked-up grid cells, the positions where a missing part is actually created in the traffic lines, and, based on the positions of the missing parts in the traffic lines found thereby, the corrected distribution information generation unit 25 performs a process of connecting two traffic lines divided by each missing part into one, whereby it is possible to eliminate multiple counting and missed counting.

In the following, a description will be given of each of the case of the traffic line missing pattern that causes multiple counting as shown in part (B-1) of FIG. 12 and the case of the traffic line missing pattern that causes missed counting as shown in part (B-3) of FIG. 12.

Figure 13:
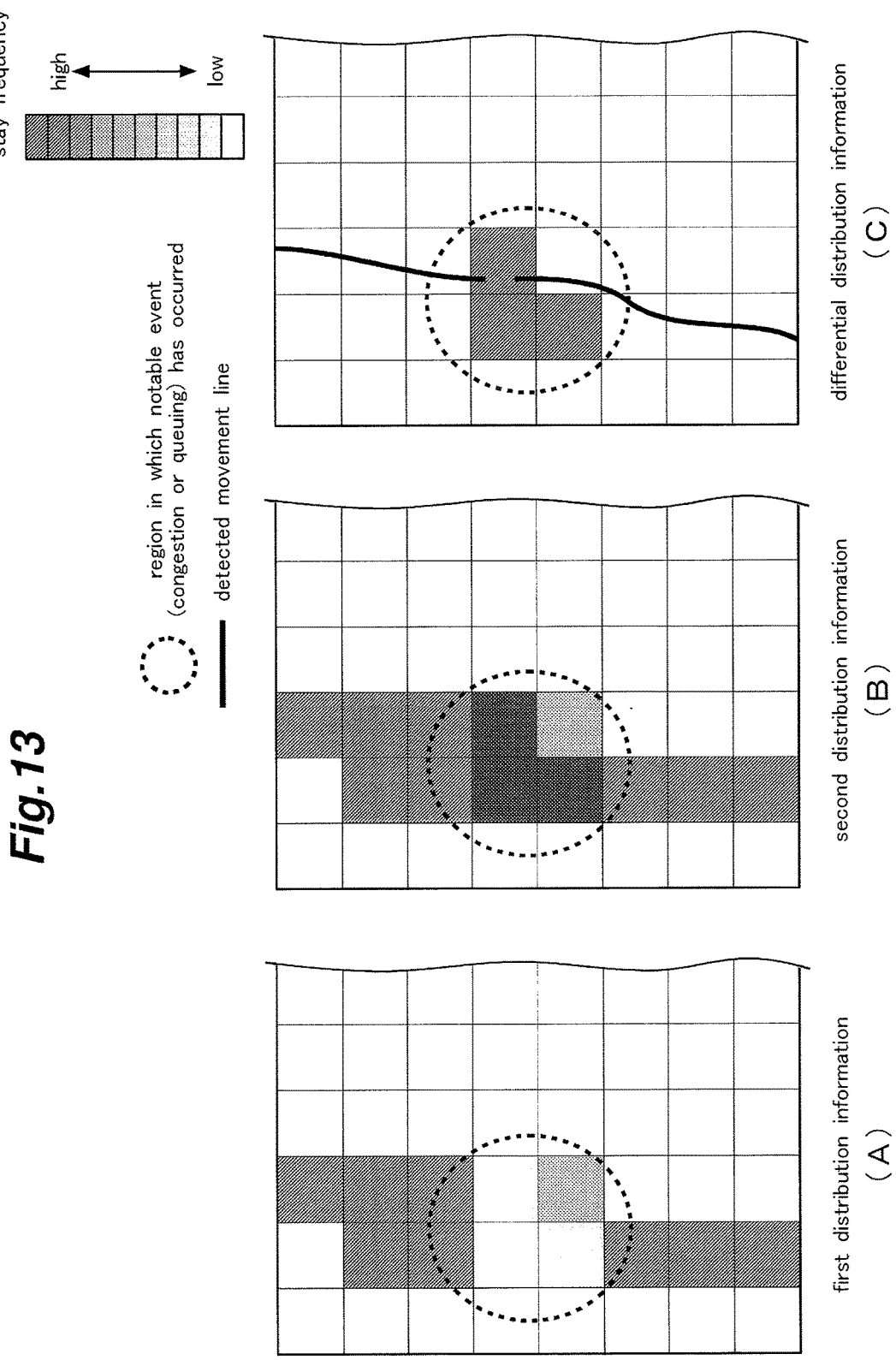
FIG. 13 is an explanatory diagram showing first distribution information, second distribution information and differential distribution information in a case of a traffic line missing pattern that causes multiple counting.

First, a description will be given of the case of the traffic line missing pattern that causes multiple counting as shown in part (B-1) of FIG. 12. FIG. 13 is an explanatory diagram showing the first distribution information, second distribution information and differential distribution information in the case of the traffic line missing pattern that causes multiple counting. It is to be noted that in FIG. 13, the distribution information is represented by a heat map for the sake of convenience of description, but the heat map is not generated in an actual process, and the process is performed based on the numerical value (stay frequency) obtained for each grid cell.

As shown in part (A) of FIG. 13, in the first distribution information generated based on only the position information obtained when no notable event was detected, the position information obtained when a notable event (congestion or queuing) was detected is excluded, and thus, the numerical values associated with the grid cells in which a notable event has occurred are low. On the other hand, as shown in part (B) of FIG. 13, in the second distribution information generated on both the position information obtained when no notable event was detected and the position information obtained when a notable event was detected, position information relating to the traffic lines having a missing part due to the notable event, namely, position information that may cause multiple counting is included, and as a result, the numerical values associated with the grid cells in which a notable event has occurred are incorrectly high.

In this case, as shown in part (C) of FIG. 13, the differential distribution information, namely, a difference obtained by subtracting the numerical value for each grid cell in the first distribution information from the numerical value for the corresponding grid cell in the second distribution information has a large value at the grid cells in which a missing part of a traffic line is present. Thus, a missing part in a traffic line is detected based on the information relating to the grid cells at which the difference has a large value. If a missing part in a traffic line is detected in these grid cells, a position information correction process is performed to connect the two traffic lines divided by the missing part, namely, associate the two traffic lines, which have been associated with different persons, with a same person. Thereby, multiple counting of traffic lines (staying persons) in each grid cell can be avoided.

Figure 14:
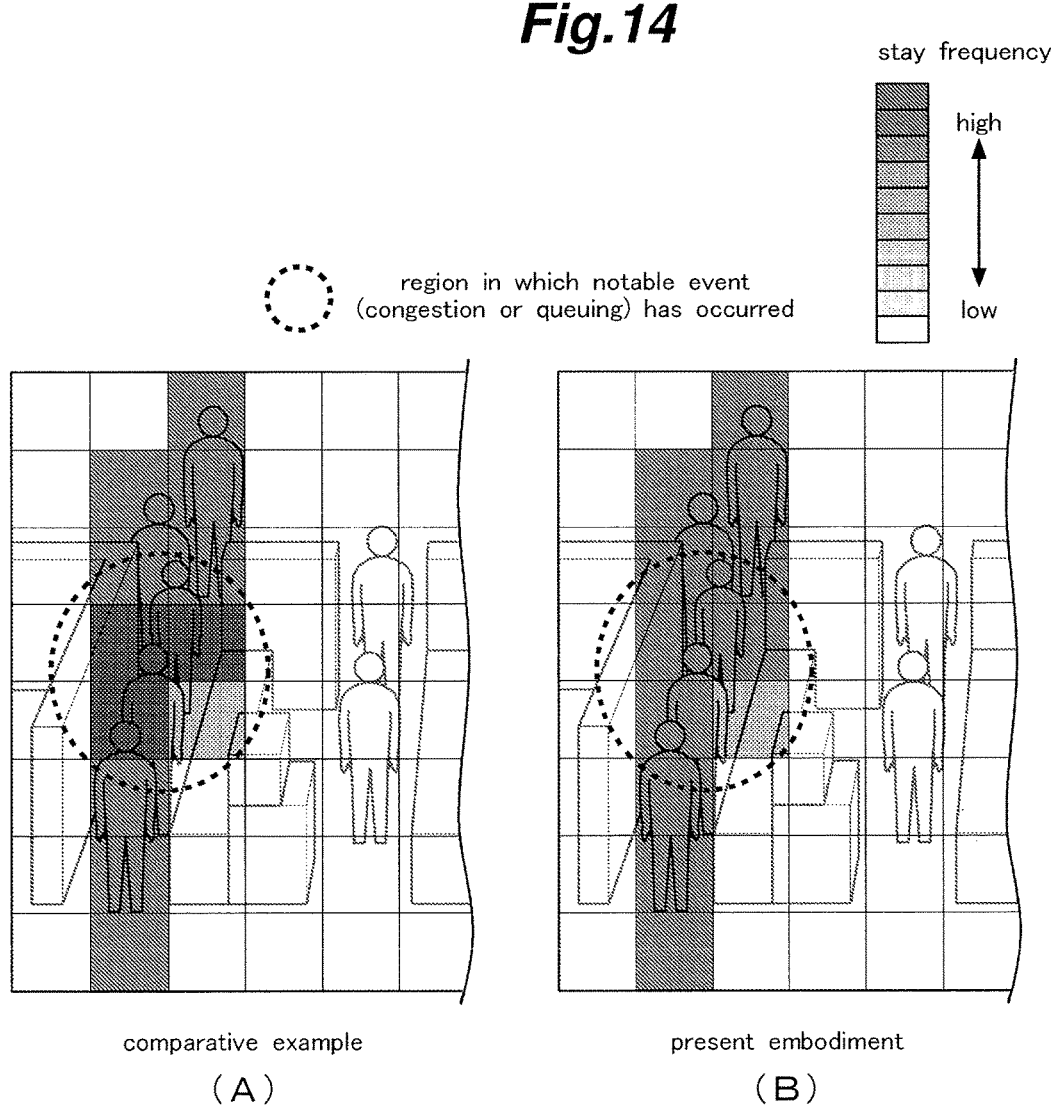
FIG. 14 is an explanatory diagram showing heat maps generated in a case of a traffic line missing pattern that causes multiple counting.

FIG. 14 is an explanatory diagram showing heat maps generated in the case of the traffic line missing pattern that causes multiple counting as shown in FIG. 13. Specifically, part (A) of FIG. 14 shows a heat map generated in a comparative example and part (B) of FIG. 14 shows a heat map generated in the present embodiment. It is to be noted that in the screen displayed on the monitor 7, the image of the heat map is displayed superimposed on the image of the target area, where the image of the heat map is transparent or translucent.

As shown in part (A) of FIG. 14, in the comparative example in which the position information correction process, namely, the correction process for connecting the two traffic lines divided by a missing part into one is not performed, an incorrect heat map is generated in which the stay frequency (number of staying persons detected per unit time) has an improperly high value in the grid cells in which multiple counting has occurred. On the other hand, as shown in part (B) of FIG. 14, in the present embodiment, an appropriate heat map is generated as multiple counting is avoided owing to the position information correction process.

Figure 15:
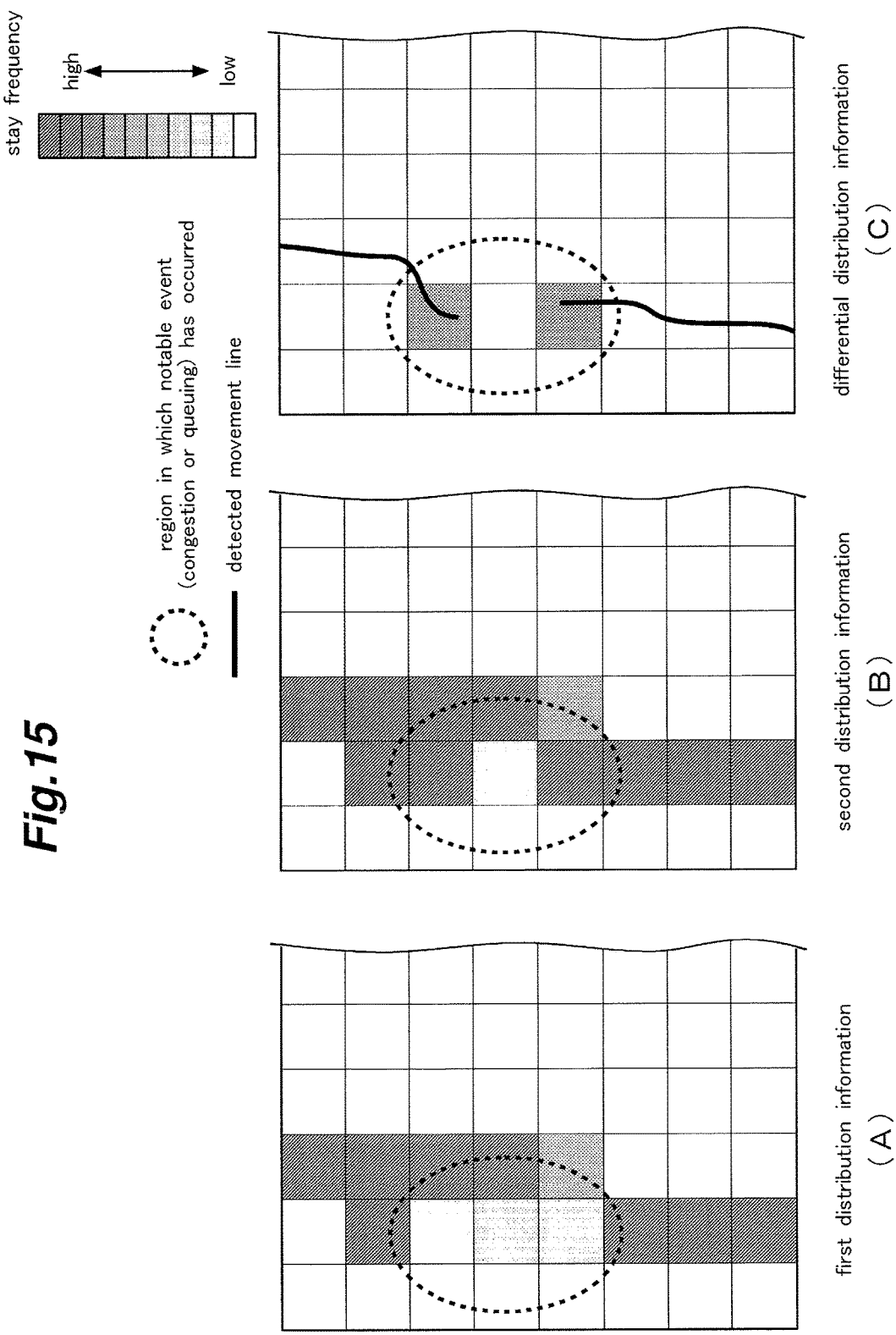
FIG. 15 is an explanatory diagram showing first distribution information, second distribution information and differential distribution information in a case of a traffic line missing pattern that causes missed counting.

Next, a description will be given of the case of the traffic line missing pattern that causes missed counting as shown in part (B-3) of FIG. 12. FIG. 15 is an explanatory diagram showing the first distribution information, second distribution information and differential distribution information in the case of the traffic line missing pattern that causes missed counting. It is to be noted that in FIG. 15, the distribution information is represented by a heat map for the sake of convenience of description, but the heat map is not generated in an actual process, and the process is performed based on the numerical value (stay frequency) obtained for each grid cell.

As shown in part (A) of FIG. 15, in the first distribution information generated based on only the position information obtained when no notable event was detected, the position information obtained when a notable event (congestion or queuing) was detected is excluded, and thus, the numerical values associated with the grid cells in which a notable event has occurred are low. On the other hand, as shown in part (B) of FIG. 15, in the second distribution information generated based on both the position information obtained when no notable event was detected and the position information obtained when a notable event was detected, position information relating to the traffic lines having a missing part due to the notable event, namely, position information that may cause missed counting is included, and as a result, the numerical values associated with the grid cells in which a notable event has occurred are incorrectly low.

In this case, as shown in part (C) of FIG. 15, the differential distribution information, namely, a difference obtained by subtracting the numerical value for each grid cell in the first distribution information from the numerical value for the corresponding grid cell in the second distribution information has a large value at either end one of the grid cells in which a missing part of a traffic line is present because there is a traffic line in each of the end grid cells, while the difference has a small value at intermediate grid cells as there is no traffic line therein due to the missing part. Thus, a missing part in a traffic line is detected based on the positional relationship between the grid cells at which the difference has a large value and the grid cells at which the difference has a small value. If a missing part in a traffic line is detected in these grid cells, a connection line for connecting the two traffic lines divided by the missing part is obtained and the position information is corrected to represent the state of the two traffic lines connected by the connection line. Thereby, the traffic line (connection line) comes to be present in the intermediate grid cells in which no traffic line was present due to the missing part, and missed counting of traffic lines (staying persons) in each grid cell can be avoided.

Figure 16:
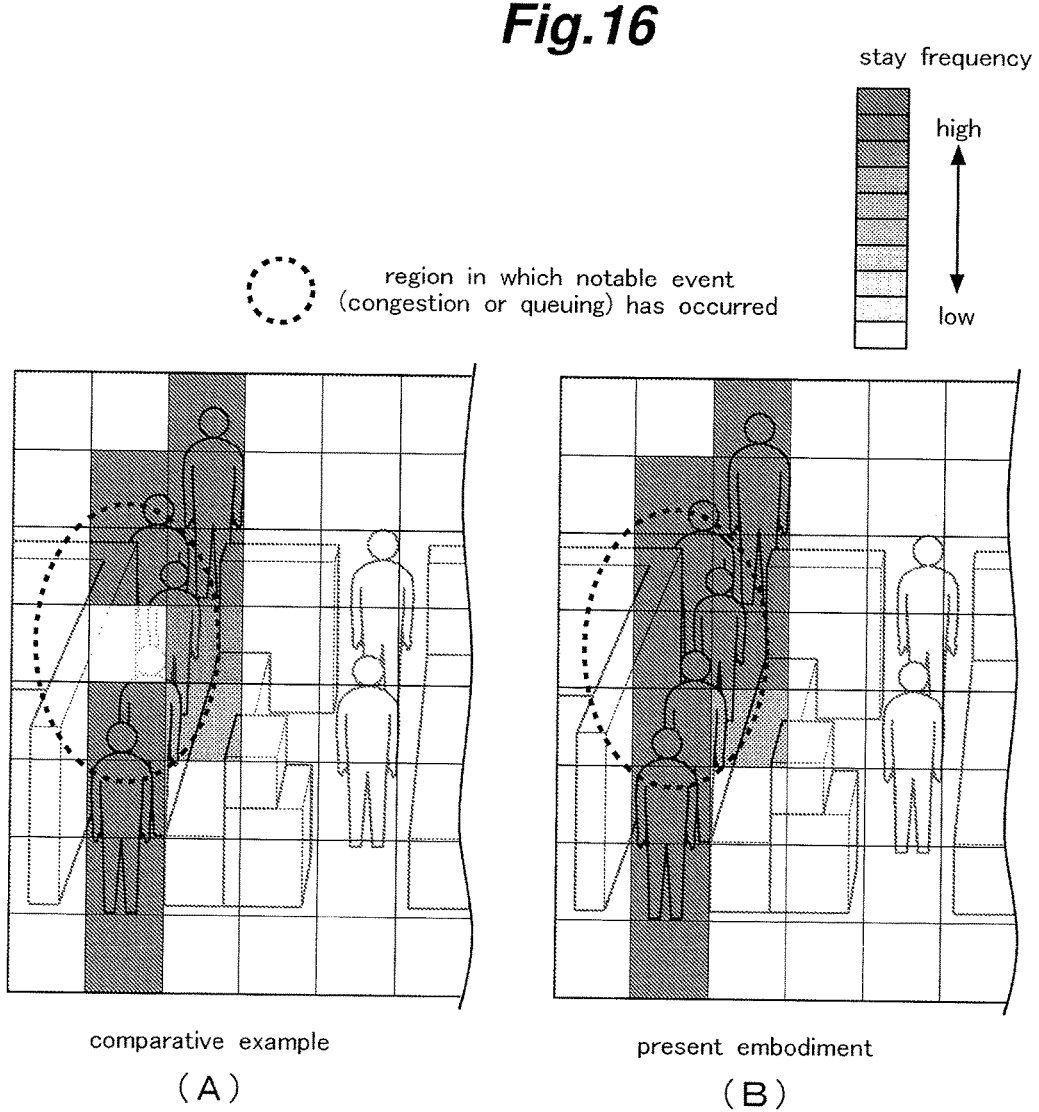
FIG. 16 is an explanatory diagram showing heat maps generated in a case of a traffic line missing pattern that causes missed counting.

FIG. 16 is an explanatory diagram showing heat maps generated in the case of the traffic line missing pattern that causes missed counting as shown in FIG. 15. Specifically, part (A) of FIG. 16 shows a heat map generated in a comparative example and part (B) of FIG. 16 shows a heat map generated in the present embodiment. It is to be noted that in the screen displayed on the monitor 7, the image of the heat map is displayed superimposed on the image of the target area, where the image of the heat map is transparent or translucent.

As shown in part (A) of FIG. 16, in the comparative example in which the position information correction process, namely, the correction process for correcting the two traffic lines divided by a missing part into one is not performed, an incorrect heat map is generated in which the stay frequency (number of staying persons detected per unit time) has an improperly low value in the grid cell in which missed counting has occurred. On the other hand, as shown in part (B) of FIG. 16, in the present embodiment, an appropriate heat map is generated as missed counting is avoided owing to the position information correction process.

It is to be noted that to improve the efficiency and accuracy of the process of detecting the position of the missing part in the traffic line, it is preferred to determine which of the traffic line missing pattern is applicable (traffic line missing pattern determination), and to perform the process appropriately according to the applicable traffic line missing pattern. Further, in the traffic line missing pattern determination, it is possible to determine the applicable traffic line missing pattern with a high accuracy based on the positional relationship between the grid cells at which the difference has a large value and the grid cells at which the difference has a low value.

As described in the foregoing, in the present embodiment, by comparing the first distribution information and the second distribution information respectively generated from the two groups of pieces of position information sorted in accordance with the degree of possibility that the pieces of position information may include an error due to a missing part that may be included in the traffic lines of the persons (moving objects), it is possible to detect the position of the missing part in the traffic lines easily and with a high accuracy. Further, by generating corrected distribution information based on the result of the detection, it is possible, even in a situation where the traffic lines may include a missing part, to make an appropriate correction to eliminate multiple counting and missed counting due to the missing part in the traffic lines, to thereby generate a highly accurate heat map.

Further, in the present embodiment, the position information sorting unit 22 detects a notable event that may cause a missing part to be created in the traffic lines of persons and performs the sorting of the pieces of position information according to whether or not the notable event is detected. The position information obtained when the notable event is not detected has a low possibility of including an error while the position information obtained when the notable event is detected has a high possibility of including an error, and thus, by performing the sorting of the pieces of position information according to the result of detection of the notable event, the sorting of the pieces of position information in accordance with the degree of possibility that the pieces of position information may include an error can be achieved easily and with a high accuracy.

Further, in the present embodiment, the notable event detection unit 31 detects, as a notable event, a congestion event in which multiple persons are present densely and a queuing event in which multiple persons are standing in a queue. In a situation where such an event occurs, occlusions between persons tend to occur so that the accuracy of the person detection tends to be lowered, and therefore, the traffic lines of persons often include a missing part therein. Thus, by sorting the items of position information based on whether or not the congestion event or queuing event is detected, it is possible to detect the position of the missing part in the traffic lines with a high accuracy.

Further, in the present embodiment, the distribution information comparison unit 23 generates differential distribution information representing a difference between the first distribution information and the second distribution information, and the missing part position detection unit 24 detects the position of the missing part in the traffic lines based on the differential distribution information. This makes it possible to detect the position of the missing part in the traffic lines efficiently.

Further, in the present embodiment, a segmented heat map representing the stay frequency of persons for each of the grid cells (division areas) defined by segmenting the target area is generated, and this enables a user to grasp at a glance a state of distribution of the stay frequency of persons in the target area.

Further, in the present embodiment, at least one of the visualization elements of the heat map including hue, shade and pattern image is varied depending on the stay frequency of persons (number of staying persons detected per unit time) to visualize the state of distribution of the stay frequency of persons, and thus, the user can readily grasp the state of distribution of the stay frequency of persons.

Figure 17:
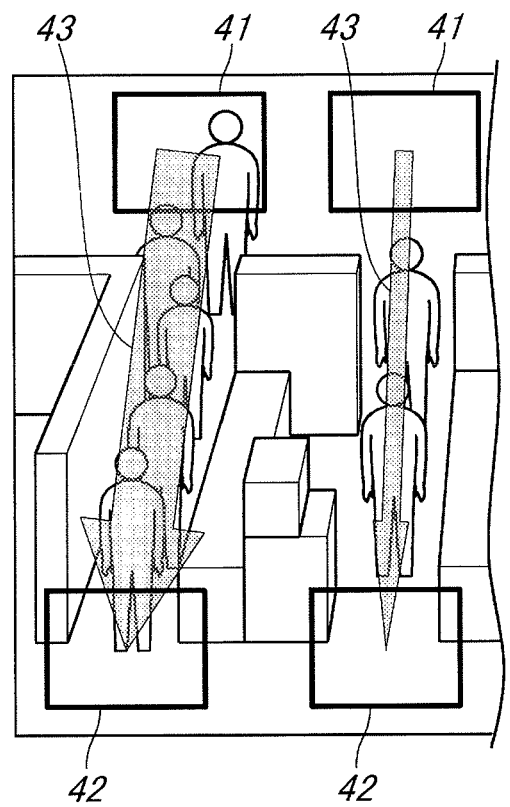
FIG. 17 is an explanatory diagram for explaining a point-to-point heat map generated by the PC 3 and displayed on the monitor 7.

Next, a description will be given of another example of the heat map generated by the PC 3 shown in FIG. 1 and displayed on the monitor 7. FIG. 17 is an explanatory diagram for explaining a point-to-point heat map generated by the PC 3 and displayed on the monitor 7.

This point-to-point heat map is designed to visualize the movement frequency of persons between two points in the target area. Specifically, in the present embodiment, pairs of a first area 41 and a second area 42 are set in the target area, and the state of movement of persons from the first area 41 to the second area 42 is represented by an arrow image 43. Particularly, the arrow image 43 represents the movement frequency of persons, namely, the number of persons who moved from the first area 41 to the second area 42 per unit time, with a thickness of the arrow.

The first area 41 and the second area 42 are set by a user. The number of persons who moved from the first area 41 to the second area 42 can be obtained by counting, based on the position information, the persons who were detected at each of the first area 41 and the second area 42 and for whom the time of detection at the second area 42 is later than the time of detection at the first area 41.

With such a point-to-point heat map, the user can grasp the state of movement of persons between two points at a glance. Further, by use of the corrected position information, it is possible to increase the accuracy of the point-to-point heat map. Particularly, in the example shown in FIG. 17, the first area 41 is set on the entrance side of the checkout counter and the second area 42 is set on the exit side of the checkout counter, and thus, the point-to-point heat map makes it possible to grasp the number of persons passing through the checkout counter.

Although the present invention has been described in terms of preferred embodiments thereof, these embodiments are mere examples and the present invention is not limited by the embodiments. It is also to be noted that not all of the structural elements of the staying state analysis device, staying state analysis system and staying state analysis method shown in the foregoing embodiments are necessarily indispensable, and they may be selectively used as appropriate without departing from the spirit of the present invention.

For instance, in the foregoing embodiment, a target area was set to include the checkout counters in retail stores such as a supermarket, but the target area may be set at any place where a queue(s) may be formed, such as an ATM corner in a bank, an entrance gate or a reception desk of a site of an event, exhibition, etc., or an area in front of an exhibition panel, exhibition booth or the like.

Further, in the foregoing embodiment, a description was made of an example in which the moving objects for which a stay duration is measured were persons. However, the moving objects may be other than persons. For example, in a case where the moving objects are vehicles such as cars, bicycles or the like, the present invention may be used to grasp the staying state of the vehicles entering a parking lot.

Further, in the foregoing embodiment, the moving object detection device 4 was configured to detect moving objects from the images provided by the camera 1 by means of image analysis and output the position information obtained thereby, but, instead of/in addition to such a structure, it is possible to adopt a structure for detecting moving objects by use of wireless signals, such as a structure utilizing a wireless sensor for detecting tags attached to moving objects, a structure using GPS (Global Positioning System) to detect moving objects, or a structure using a position sensor that detects persons by use of light may be adopted. In such cases, a position information sorting process is performed such that the pieces of position information of moving objects obtained on a detection time basis and output at regular intervals from the moving object detection means such as a sensor are sorted in accordance with the degree of possibility that a missing part may be created in the traffic lines of the moving objects.

Further, in the foregoing embodiment, the position information sorting unit 22 was configured to detect a notable event based on the position information of the moving objects, and perform the sorting of the pieces of position information in accordance with the result of the detection. However, it is also possible to detect a notable event based on information other than the position information of the moving objects. In addition, it is possible to assess the degree of possibility that the position information may include an error due to a missing part that may be created in the traffic lines, without detecting a notable event. For example, it is possible to set a target area in the imaging area of the camera 1, determine whether each traffic line is normal or abnormal based on whether the traffic line is continuous from the entrance to the exit of the target area, and determine that the position information relating to the person having an abnormal traffic line has a high possibility of including an error due to a missing part in the traffic line. In this case, it is necessary to obtain the position information at many time points in order to assess the continuity of each traffic line, and thus, it may be difficult to adopt this method in generating a heat map in real-time. In contrast, in the method based on the determination whether a notable event is detected as in the present embodiment, the determination can be made based on the position information detected from a single frame of image, and thus, the method is suitable for generating a heat map in real-time.

Further, in the foregoing embodiment, the congestion event detection process was performed following the procedure shown in FIG. 9, but the congestion event detection process is not limited thereto and various methods, such as a method using a degree of spread of the position information instead of a variance or a method that does not include grouping of the person candidate frame, may be used. Other know methods may also be used. Further, in the foregoing embodiment, the queuing event detection process was performed following the procedure shown in FIG. 11, but the queuing event detection process is not limited thereto, and other known methods may be used therefor.

Further, in the foregoing embodiment, as shown in FIG. 3, the division areas of the target area were realized as grid cells formed by dividing the target area in a grid pattern, but the present invention is not limited to a structure in which the target area is divided in a grid pattern and the target area may be divided by any appropriate division lines in accordance with the situation inside the target area. Further, the number of divisions of the target area (number of division areas) may be selected as appropriate. Also, the division areas do not have to have an identical size, and each division area may have an appropriate size in accordance with the situation inside the target area.

Further, in the foregoing embodiment, the corrected distribution information generation unit 25 was configured to correct the position information based on the position of the missing part in the traffic lines, and generate the corrected distribution information by use of the corrected position information. However, it is possible to generate distribution information without correcting the position information, and thereafter correct the distribution information to generate corrected distribution information. For example, similar corrected distribution information can be generated by counting the traffic lines having a missing part in each grid cell to obtain the number of traffic lines including a missing part for each grid cell, and subtracting the number of traffic lines including a missing part in each grid cell from the number of traffic lines in the corresponding grid cell.

Further, in the foregoing embodiment, the moving object detection device 4 was provided separately from the camera 1, but a part or the entirety of the functions of the moving object detection device 4 may be incorporated into the camera 1 to constitute an imaging device having a moving object detecting function. It is also possible to realize the moving object detection device 4 in the PC 3.

Further, in the foregoing embodiment, the moving object detection process and the staying state analysis process were performed by a device set up at the store, but these processes may be performed by the PC 11 set up at the management office or a cloud computer 12 forming a cloud computing system, as shown in FIG. 1. Further, these necessary processes may be performed by cooperation of multiple information processing devices, in which case, the multiple information processing devices are configured to be able to communicate or share information with each other via a communication medium such as an IP network or LAN. Thereby, the multiple information processing devices jointly executing the necessary processes constitute a staying state analysis system.

In this case, it is preferred that the device set up at the store be configured to perform at least the moving object detection process. In such a structure, since the information obtained by the moving object detection process has a small amount of data, even if the remaining processes are performed by an information processing device set up at a place other than the store, such as the PC 11 disposed at the management office, the communication load can be small, and thus, it is easy to operate the system in the form of a wide area network.

It may be also preferred that the cloud computer 12 be configured to perform at least a part of the staying state analysis process that requires a large amount of computation. In such a structure, the process requiring a large amount of computation is achieved by the cloud computer 12, and therefore, it is not necessary to prepare a high-speed information processing device on the user side, namely at the store or the like. Further, since the remaining processes require a small amount of computation, the remaining processes can be performed as extended functions of an information processing device set up at the store to serve as a sales information management device, and this can reduce the cost born by the user.

The cloud computer 12 may be configured to perform the entirety of the necessary processes or may be configured to perform, of the necessary processes, at least the process of outputting the heat map. In such a structure, it becomes possible to view the staying state on a mobile terminal such as a smartphone 13 in addition to the PC 3 set up at the store and the PC 11 set up at the management office, and this allows a user to view the staying state not only at the store or the management office but also at any other place, such as a place the user is visiting on business.

Further, in the foregoing embodiment, the heat map was output on the monitor 7 of the PC 3 disposed at the store, but a browser device for viewing the heat map may be provided separately from the PC 3. For example, it is possible to use the PC 11 disposed at the management office or the smartphone 13 described above as a browser device for viewing the heat map. Besides, it is also possible to add the function of the browser device for viewing the heat map to a sales information management device disposed at the store. The heat map may be output from a printer.

The staying state analysis device, staying state analysis system and staying state analysis method according to the present invention make it possible, even in a situation where traffic lines may include a missing part, to generate a highly accurate heat map by making appropriate corrections, and thus, are useful as a staying state analysis device, a staying state analysis system and a staying state analysis method for measuring a stay frequency of moving objects in a target area and generating a heat map visualizing a state of distribution of the stay frequency for display on a display device.

The invention claimed is:

1. A staying state analysis device for measuring a stay frequency of moving objects in a target area and generating a heat map visualizing a state of distribution of the stay frequency for display on a display device, the staying state analysis device comprising:
   a processor; and
   a memory storing instructions,
   wherein the processor, when performing the instructions stored in the memory, comprises:
   a position information sorter that sorts pieces of position information of the moving objects obtained from a moving object detection device in accordance with a degree of possibility that the pieces of position information may include an error due to a missing part of the moving objects that may be created in queues of the moving objects, the position information sorter comprising an occlusion event detector that:
   detects, based on the pieces of position information of the moving objects, an occlusion event that may cause the missing part of the moving objects to be created in the queues of the moving objects, and
   sorts the pieces of position information based on whether the occlusion event is detected by the occlusion event detector;
   a distribution information comparator that generates:
   two sets of distribution information for comparison, each representing a state of distribution of the stay frequency of the moving objects, respectively from at least two groups of pieces of position information sorted by the position information sorter, and compares the two sets of distribution information for comparison with each other; and
   differential distribution information which is a difference between the two sets of distribution information for comparison;
   a missing part position detector that detects a position of the missing part in the queues based on:
   the at least two groups of pieces of position information sorted by the position information sorter, and
   the differential distribution information;
   a corrected distribution information generator that generates corrected distribution information representing the stay frequency of the moving objects corrected based on a result of detection by the missing part position detector; and
   a heat map generator that, due to the detected missing part, generates an improved heat map free of either of multiple counted and missed counted moving objects, based on the corrected distribution information generated by the corrected distribution information generator such that the improved heat map visualizes the state of distribution of the stay frequency for display on the display device.

2. The staying state analysis device according to claim 1, wherein the occlusion event detector detects, as the occlusion event, a congestion event in which a plurality of the moving objects are present densely.

3. The staying state analysis device according to claim 1, wherein the occlusion event detector detects, as the occlusion event, a queuing event in which a plurality of the moving objects stand in one of the queues.

4. The staying state analysis device according to claim 1, wherein the heat map generator generates a segmented heat map representing the stay frequency of the moving objects for each of a plurality of division areas defined by segmenting the target area.

5. The staying state analysis device according to claim 1, wherein the heat map generator varies at least one of visualization elements of the heat map including hue, shade, and pattern image to visualize the state of distribution of the stay frequency of the moving objects.

6. The staying state analysis device according to claim 1, wherein the heat map generator generates a point-to-point heat map visualizing a movement frequency of the moving objects between two points in the target area.

7. A staying state analysis system for measuring a stay frequency of moving objects in a target area and generating a heat map visualizing a state of distribution of the stay frequency for display on a display device, the system comprising:
   a moving object detection device that detects moving objects in the target area and outputs pieces of position information of the moving objects;
   the display device that displays the heat map; and
   a plurality of information processing devices,
   wherein the plurality of information processing devices jointly comprise:
   a position information sorter that sorts the pieces of position information of the moving objects obtained from the moving object detection device in accordance with a degree of possibility that the pieces of position information may include an error due to a missing part of the moving objects that may be created in queues of the moving objects, the position information sorter comprising an occlusion event detector that:
   detects, based on the pieces of position information of the moving objects, an occlusion event that may cause the missing part of the moving objects to be created in the queues of the moving objects, and
   sorts the pieces of position information based on whether the occlusion event is detected by the occlusion event detector;
   a distribution information comparator that generates:
   two sets of distribution information for comparison, each representing a state of distribution of the stay frequency of the moving objects, respectively from at least two groups of pieces of position information sorted by the position information sorter, and compares the two sets of distribution information for comparison with each other; and differential distribution information which is a difference between the two sets of distribution information for comparison;

a missing part position detector that detects a position of the missing part in the queues based on:

the at least two groups of pieces of position information sorted by the position information sorter; and the differential distribution information;

a corrected distribution information generator that generates corrected distribution information representing the stay frequency of the moving objects corrected based on a result of detection by the missing part position detector; and a heat map generator that, due to the detected missing part, generates an improved heat map free of either of multiple counted and missed counted moving objects, based on the corrected distribution information generated by the corrected distribution information generator such that the improved heat map visualizes the state of distribution of the stay frequency for display on the display device.

8. A staying state analysis method for performing, with an information processing device, a process of measuring a stay frequency of moving objects in a target area and generating a heat map visualizing a state of distribution of the stay frequency for display on a display device, the method comprising:

sorting pieces of position information of the moving objects obtained from a moving object detection device in accordance with a degree of possibility that the pieces of position information may include an error due to a missing part of the moving objects that may be created in queues of the moving objects;

detecting, based on the pieces of position information of the moving objects, an occlusion event that may cause the missing part of the moving objects to be created in the queues of the moving objects;

sorting the pieces of position information based on the detecting of the occlusion event;

generating:

two sets of distribution information for comparison, each representing a state of distribution of the stay frequency of the moving objects, respectively from at least two groups of pieces of position information sorted by the sorting, and comparing the two sets of distribution information with each other; and differential distribution information which is a difference between the two sets of distribution information for the comparing;

detecting a position of the missing part in the traffic lines based on:

the at least two groups of pieces of position information sorted by the sorting; and the differential distribution information;

generating corrected distribution information representing the stay frequency of the moving objects corrected based on a result of the detecting; and generating, due to the detected missing part, an improved heat map free of either of multiple counted and missed counted moving objects, based on the corrected distribution information, wherein at least one of the sorting pieces of position information, the detecting a position of the missing part in the traffic lines, the generating corrected distribution information, and the generating the heat map is performed by a processor such that the improved heat map visualizes the state of distribution of the stay frequency for display on the display device.

* * * * *